United States Patent
Fracassi

(10) Patent No.: US 11,954,556 B1
(45) Date of Patent: Apr. 9, 2024

(54) WEARABLE GLOVE WITH AUTO RECOGNITION

(71) Applicant: Datalogic I.P. Tech S.R.L., Lippo di Calderara di Reno (IT)

(72) Inventor: Stefano Fracassi, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 18/092,538

(22) Filed: Jan. 3, 2023

(51) Int. Cl.
*G06K 7/10* (2006.01)
*G06K 7/14* (2006.01)

(52) U.S. Cl.
CPC ..... *G06K 7/10891* (2013.01); *G06K 7/10386* (2013.01); *G06K 7/10396* (2013.01); *G06K 7/1417* (2013.01); *G06K 2007/10534* (2013.01)

(58) Field of Classification Search
CPC .......... G06K 7/10891; G06K 7/10386; G06K 7/10396; G06K 7/1417; G06K 7/10881; G06K 2007/10534
USPC ................... 235/462.44, 462.43, 462.01, 375
See application file for complete search history.

(56) References Cited

U.S. PATENT DOCUMENTS

| | | | |
|---|---|---|---|
| 5,587,577 A | 12/1996 | Schultz | |
| 7,764,488 B2 | 7/2010 | Calvarese | |
| 8,260,384 B2 | 9/2012 | Wulff et al. | |
| 9,224,027 B2 | 12/2015 | Van Horn et al. | |
| 9,507,988 B2 | 11/2016 | Van Horn et al. | |
| 9,679,180 B2 | 6/2017 | Lim et al. | |
| 9,721,129 B1 | 8/2017 | Dasarathan et al. | |
| 9,727,769 B2 | 8/2017 | Oberpriller et al. | |
| 10,135,213 B2 | 11/2018 | Brunnbauer et al. | |
| 10,466,782 B2 | 11/2019 | Brunnbauer et al. | |
| 10,528,780 B2 | 1/2020 | Lim et al. | |
| 10,537,143 B2 | 1/2020 | Guenther et al. | |
| 10,726,222 B2 | 7/2020 | Oberpriller et al. | |
| 2012/0187192 A1* | 7/2012 | Lee .................... | G06K 7/10891 235/462.44 |
| 2018/0146720 A1 | 5/2018 | Sittig et al. | |
| 2019/0364996 A1 | 12/2019 | Kettner et al. | |
| 2020/0022433 A1 | 1/2020 | Zhang et al. | |
| 2021/0153631 A1 | 5/2021 | Choi et al. | |
| 2021/0219639 A1 | 7/2021 | Kettner et al. | |
| 2021/0303806 A1 | 9/2021 | Au et al. | |

* cited by examiner

*Primary Examiner* — Edwyn Labaze
(74) *Attorney, Agent, or Firm* — The Juhasz Law Firm

(57) ABSTRACT

A hand wearable includes a flexible body, a barcode scanner attachment device, a trigger device, and a nonvolatile memory device. The nonvolatile memory device stores hand wearable, barcode scanner, or both specific information including one or more data indicative of the life of the hand wearable, the life of a scanner operatively coupled to the barcode scanner attachment device, or both. The nonvolatile memory device holds the stored hand wearable, barcode scanner, or both specific information when power to the nonvolatile memory device is turned off. The nonvolatile memory device makes the stored hand wearable, barcode scanner, or both specific information available when the power to the nonvolatile memory device is turned on. A system, method of using, and method of manufacturing the hand wearable is also disclosed.

20 Claims, 27 Drawing Sheets

910A

920 - Providing a hand wearable with a barcode scanner attachment device and nonvolatile memory storing hand wearable-specific information on a hand wearable 922 - Connecting a barcode reader to the barcode scanner attachment device 924 - Receiving at the at the barcode reader, hand wearable, barcode scanner, or both specific specific information from the nonvolatile memory of the hand wearable 926 - Storing the hand wearable, barcode scanner, or both specific specific information received from the nonvolatile memory of the hand wearable 928 - Tracking the failure rate or usage of the hand wearable with the hand wearable 930 - Implementing a predetermined predictive action protocol to determine failure of the hand wearable 932 – Generating at or sending an alert to the barcode reader when the predetermined predictive action protocol indicates an impending failure of the hand wearable

940 - Providing a hand wearable with a barcode scanner attachment device and nonvolatile memory storing hand wearable-specific information on the hand wearable and a barcode scanner attached 942 - Connecting a barcode reader to the barcode scanner attachment device 944 - Connecting the barcode reader to an online cloud computer 946 - Receiving at the barcode reader, the online cloud computer, or both hand wearable, barcode scanner, or both specific specific information from the nonvolatile memory of the hand wearable 948 - Storing the hand wearable-specific information received from the nonvolatile memory of the hand wearable 950 - Tracking the failure rate or usage of the hand wearable, a barcode scanner used with the hand wearable, or both 952 - Implementing a predetermined predictive action protocol to determine failure of the hand wearable, the barcode scanner, or both 954 - Generating at or sending an alert to the barcode reader when the predetermined predictive action protocol indicates an impending failure of the hand wearable or the barcode scanner

FIG. 10B

WEARABLE GLOVE WITH AUTO RECOGNITION

FIELD OF INVENTION

This disclosure relates to wearable for barcode scanners and more particularly to a wearable for barcode scanner for tracking the failure rate and/or usage of a hand wearable and/or a trigger device in order to better implement predictive action to avoid an oncoming failure.

BACKGROUND

Bar code readers are well known devices. A bar code includes a series of encoded symbols. Each symbol consists of a series of light and dark regions, rectangular in shape and referred to as bars. The widths of the bars, and the widths of the light spaces between the bars indicate the encoded information. A bar code reader illuminates the bar code, captures the light reflected from the code, determines the widths and spacings of the code symbols, and derives the encoded data from those widths and spacings.

Bar code readers are powerful tools that can save time, reduce labor costs, reduce worker error, improve inventory control, and enable better customer service. Bar code readers may be fixed mounted, that is installed in a stationary location like for reading items on a moving conveyor belt; in-counter, that is, they are integrated into a counter, like a retail point-of-sale counter; on-counter, that is, they rest on a counter; part of a mobile computing device, like a smart device; hand-held, typically in the form factor of a pistol; and a wearable, like a bar code reader integrated into a ring or wearable artifact like a hand wearable, like a glove.

Wearable barcode readers may be useful where an operator needs his or hands free to touch, lift, hold, or otherwise manipulate objects. For example, a wearable bar code reader may allow the operator to engage in tasks like lifting and moving boxes with the bar code reader ready for scanning a bar code by simple activation of the trigger when the need arises.

Many wearable barcode readers embed a trigger device into a hand wearable that is of a mechanical form factor, like a physical push-button mechanism. Activation of the push-button is typically by pressing down on the button. Electrical sensors activated by touch or motion or in other ways may also be used.

The selection of a trigger device for use with a wearable is not an easy thing to do. The selection involves a design tradeoff between several variables including the application of the wearable trigger, the material of the wearable, the electrical components required to support the application of the wearable, and the trigger itself.

A wearable barcode reader poses other design challenges. One problem faced by wearable barcode readers is that any operational failure of the wearable or the trigger device component of the hand wearable barcode scanner results in not only failure of the operation at hand; but also the down-time of the use of the wearable barcode reader while the operator secures and changes out the failed component. This problem underscores some significant advantages that could be attained if the component were replaced prior to the failure.

Another problem with a hand wearable is that wearable become used up or "consumed" after experiencing prolonged periods of wear and tear. Once the "consumption" from wear and tear is extensive, the hand wearable is destined for failure. Certain failures are easy to see coming. For example, wear and tear on a wearable may be visible to the operator. If on inspection, the wearable seems ready for failure, the operator can change out the wearable in advance of failure; thereby avoiding having the wearable fail during an operation and creating failure of the operation and down-time of the use of the wearable barcode reader while the operator secures and changes out the wearable.

Other failures are more difficult to see coming. For instance, a trigger on the wearable has a predefined performance specification. That is to say, each trigger is designed to have a set of performance characteristics and those performance characteristics are usually defined by the specifications that are provided on the trigger device. For example, many trigger devices are designed to last a predetermined number of activations for a specified range of operation such as a specified amount of pressure applied to the trigger. Once the number of activations for which the trigger device has been designed has been consumed, the trigger device fails.

Another problem with a hand wearable is that the life of the trigger device may be shortened if the trigger device is misused. For example, if a pressure applied to the trigger device is far greater than the pressure the device is designed to receive, the trigger device will break. Even if the pressure applied in one activation does not break the trigger device, the combined effect of applying pressures greater than allowed for in the specification over time can accelerate the consumption of the trigger device and lead to failure of the trigger device well before the life span provided in the specification. In those cases, it doesn't help to plan replacement of the trigger device before expiry of its specified life because the heavy use will lead to failure before then.

Another problem posed by a wearable barcode reader is that the trigger device is typically part of the wearable and not part of the barcode scanner itself. This allows a wearable to be used with several barcode scanners. When a barcode reader is attached to the wearable it may keep track of the number of activations of a trigger device. Once the barcode reader is replaced, it no longer does that. While the replacement barcode reader may keep track of activations of a trigger device once connected, there is no single barcode reader that knows collective lifetime information about the trigger device of the wearable that could help predict and avert a trigger device failure.

In a wearable barcode scanner, the wearable itself poses other problems. A significant problem with wearables is that a hand wearable is in constant contact with the skin of the operator when worn. The wearable experiences the strains of an operator's hand and conforms its form factor to those strains. Since no two hands are alike, the use of a single hand wearable among several operators forces the hand wearable to conform its form factor to different strains of different operators; resulting in a form factor that may no longer "fit like a glove" for any one operator.

In addition, the perspiration from the hand of an operator may be absorbed by the hand wearable. The sharing of gloves so wetted from operation is not hygienic. Even without wetting, the absorption of biomaterials from the hand of an operator during use makes the sharing of gloves less hygienic.

Another problem is the limited battery life that a scanner has on a hand wearable due to the small power capacities of the batteries that power its onboard electronics. This makes it necessary to continually swap out a barcode scanner on a hand wearable for another barcode scanner that has been recharged in the meantime. This increases the likelihood that no one barcode scanner will know the life history of the wearable including its trigger device.

All of the foregoing and other problems present genuine issues for a host system to ensure the integrity of the hand wearable and trigger device. There is a need for a better way to track the failure rate and/or usage of a hand wearable and/or a trigger device in order to better implement predictive action to avoid an oncoming failure. This disclosure addresses that need.

SUMMARY

A hand wearable for bar code reading includes a flexible body, a barcode scanner attachment device, a trigger device, and a nonvolatile memory device. The flexible body includes a thumb opening, a back of the hand portion, a palm of the hand portion, and means for securing the flexible body about a hand. The barcode scanner attachment device is attached on a back side of a back of the hand portion of the flexible body. The barcode scanner attachment device is configured to removably couple thereto a barcode reader. The trigger device is attached on the back side of the back of the hand portion of the flexible body. The trigger device is electrically coupled to a trigger port of the barcode scanner attachment device. The nonvolatile memory device is attached on the back side of the back of the hand portion of the flexible body. The nonvolatile memory device is electrically coupled to a memory port of the barcode scanner attachment device. The nonvolatile memory device stores hand wearable, barcode scanner, or both specific information that includes one or more data indicative of the life of the hand wearable, the life of a scanner operatively coupled to the barcode scanner attachment device, or both. The nonvolatile memory device holds the stored hand wearable, barcode scanner, or both specific information when power to the nonvolatile memory device is turned off. The nonvolatile memory device makes the stored hand wearable, barcode scanner, or both specific information available when the power to the nonvolatile memory device is turned on.

A method of tracking the failure rate or usage of a hand wearable includes the steps of: (a) providing a hand wearable disclosed herein; (b) connecting a barcode reader to the barcode scanner attachment device; (c) connecting the barcode reader to an online cloud computer; (d) receiving at the barcode reader, the online cloud computer, or both hand wearable, barcode scanner, or both specific information from the nonvolatile memory device of the hand wearable; (e) storing the hand wearable, barcode scanner, or both specific information received from the nonvolatile memory device of the hand wearable; (f) tracking the failure rate or usage of the hand wearable and the scanner used with the hand wearable; (g) implementing a predetermined predictive action protocol before failure of the hand wearable or the barcode scanner; and (h) sending an alert to the barcode reader when the predetermined predictive action protocol indicates an impending failure of the hand wearable or the barcode scanner.

A method for manufacturing a wearable for tracking the failure rate or usage of the hand wearable, a scanner used with the glove, or both includes the steps of: (a) providing a hand wearable disclosed herein; (b) securing a barcode scanner attachment device to the hand wearable, the barcode scanner attachment device being configured to removably couple thereto a barcode reader; (c) securing a trigger device to the hand wearable; (d) electrically coupling the trigger device to a trigger port of the barcode scanner attachment device receptacle; (f) securing a nonvolatile memory device to the hand wearable; (g) coupling the nonvolatile memory device to a memory port of the barcode scanner attachment device. The nonvolatile memory device stores hand wearable, barcode scanner, or both specific information comprising one or more data indicative of the life of the hand wearable, the life of a scanner operatively coupled to the barcode scanner attachment device, or both. The nonvolatile memory device holds the stored hand wearable, barcode scanner, or both specific information when power to the nonvolatile memory device is turned off. The nonvolatile memory device is configured to make the stored hand wearable, barcode scanner, or both specific information available to a scanner connected to the barcode scanner attachment device, a cloud server, or both.

Additional objects and advantages of the invention will be set forth in part in the description which follows, and, in part, will be obvious from the description, or may be learned by practice of the invention.

DESCRIPTION OF DRAWINGS

FIGS. 10A, 10B (collectively FIG. 10) depict use method for tracking the life of a hand wearable with auto recognition of this disclosure or such wearable together with a scanner used therewith in a predictive action protocol according to this disclosure.

DETAILED DESCRIPTION

Figure 1A:
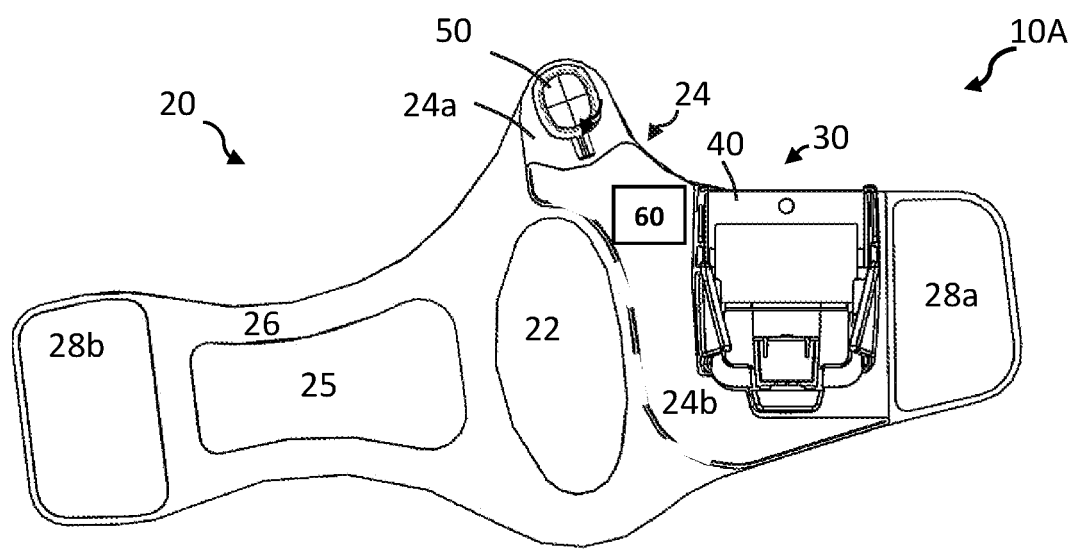
FIGS. 1A, 1B, 1C, 1D, 1E (collectively FIG. 1) together depict an illustrative embodiment of hand wearable with auto recognition.
Figure 1B:
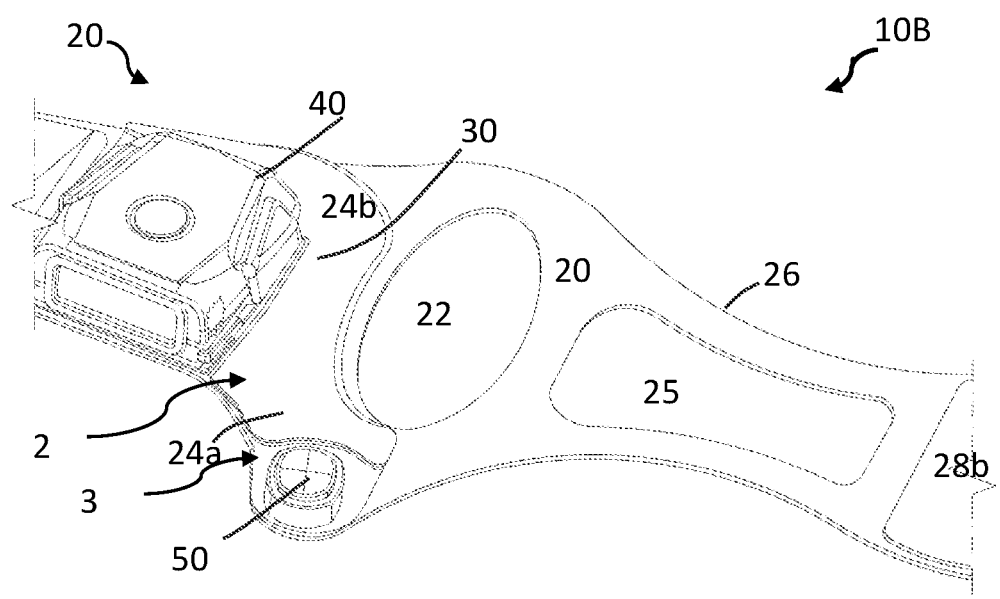
Figure 1C:
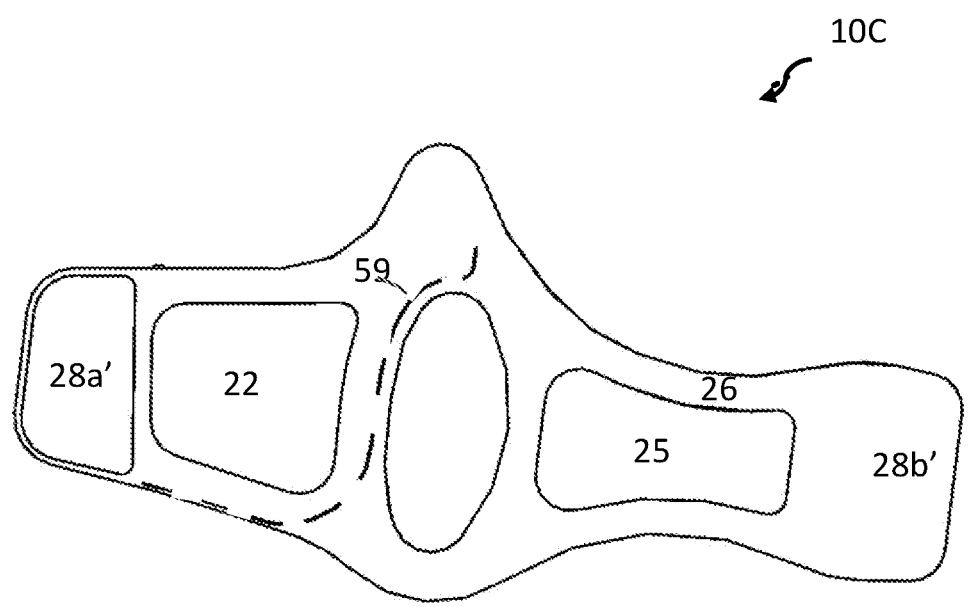

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure relates to the presence of a nonvolatile memory device embedded into either a glove or a holder or a trigger that are part of a more general wearable device. Such a nonvolatile memory device can be used for many purposes, for instance to store statistical data. The wearable device or the connected remote system can use stored data to predict specific situations and suggest possible actions (e.g. counting number of trigger pressures can be used to predict component failure and suggest glove replacement).

Broadly speaking, disclosed herein is device, system, method of using, and method of manufacturing a hand wearable including a flexible body, a barcode scanner attachment device, a trigger device, and a nonvolatile memory device. The nonvolatile memory device stores hand wearable, barcode scanner, or both specific information include one or more data indicative of the life of the hand wearable, the life of a scanner operatively coupled to the barcode scanner attachment device, or both. The nonvolatile memory device holds the stored hand wearable, barcode scanner, or both specific information when power to the nonvolatile memory device is turned off. The nonvolatile memory device makes the stored hand wearable, barcode scanner, or both specific information available when the power to the nonvolatile memory device is turned on.

By "hand wearable" is meant any wearable on the hand in any form factor including a wearable in the form factor of a glove, a wearable in the form factor of a band, a wearable in the form factor of a ring, and so on.

By "nonvolatile memory device" is meant one or more nonvolatile memory cells or a nonvolatile memory chip or a nonvolatile memory integrated circuit including one or more nonvolatile memory cells or a nonvolatile memory chip, together with circuit elements connected thereto that carry out memory hierarchy functions in association with the nonvolatile memory cells or nonvolatile memory chip, such as control circuits for memory sequencing, input protection circuits, interface circuits, and so on.

FIGS. 1A, 1B, 1C, 1D, 1E (collectively FIG. 1) together depicts an illustrative embodiment of hand wearable with auto recognition.

As depicted in FIG. 1, a hand wearable (10A, 10B, 10C, 10D, 10D, 10E) for bar code reading includes a flexible body 20, a barcode scanner attachment device 30, a trigger device 50, and a nonvolatile memory device 60.

The flexible body 20 includes a thumb opening 22, a back of the hand portion 24, a palm of the hand portion 26, and means for securing (28a, 28b) the flexible body 20 about a hand.

The flexible body 20 may be made of a single layer, or multiple layers of suitable material. As seem in FIGS. 1B, 1D, the flexible body 20 includes two layers, a first layer 2 and second layer 3. A bottom side of layer 3 (FIG. 4) rests against a hand of an operator when the wearable device is worn; and so the second layer 3 may be larger in shape and size than the first layer 3 which is designed to provide support to the barcode scanner attachment device 30, the barcode scanner used therewith, the trigger device 50, and the nonvolatile memory device 60 of this disclosure. Alternatively, the first layer 2 may be substantially similar in shape to the second layer 3. In yet other embodiments, these layers may differ in shape and size. The material of these layers may include but not limited to natural leather, plastic, silicone, rubber, elastic polymer, or other suitable resilient material or any combinations thereof. Since the first layer 2 provides a support function, the material of the first layer 2 may preferably be a harder material than the material selected for the second layer 3 which may be softer. The layer 2 is preferably glued to attach to the layer 3. Since an objective of this disclosure is the replaceability of a trigger device or wearable once reaching the end of their service life, in a preferred embodiment, layer 2 is Velcro attached to layer 3 in order to allow the two layers to be separated from each other to replace the trigger device. In an alternative embodiment, the layers are glued to attach together and then sewn together at their boundary edges to further strengthen the attachment.

Figure 4:
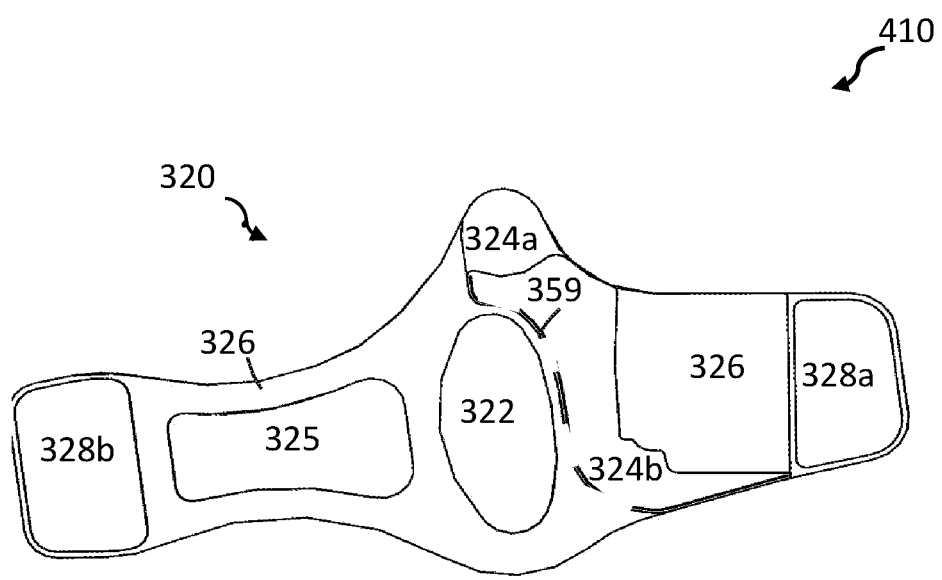
FIG. 4 depicts illustrative wearable for use with an illustrative embodiment of hand wearable with auto recognition.

The means for securing (28a, 28b) the flexible body 20 about a hand is illustratively a Velcro material adhesively secured to the wearable. FIG. 1 depicts the Velcro material along a top surface of the wearable. FIG. 4 depicts the Velcro material along a bottom surface of the wearable. As shown in FIG. 7, the wrapping of the wearable about the hand of an operator brings a Velcro material along a top surface into contact with a Velcro material along a bottom surface to hold the two Velcro materials together and hence the wearable to the hand of the operator. Referring to FIGS. 4, 7, in one example, Velcro material 28a along a top surface of the wearable is in contact with Velcro material 328b along a bottom surface of the wearable. In another example, Velcro material 28b along a top surface of the wearable is in contact with Velcro material 328a along a bottom surface of the wearable. While the means for securing (28a, 28b) have been described in terms of Velcro material, it will be appreciated that the means for securing is a matter of design choice and that any means for securing—Velcro, belt-and-buckle, and so on—may be used with this disclosure.

Referring back to FIG. 1, and the barcode scanner attachment device 30 on a back side of a back of the hand portion 24 of the flexible body 20, the barcode scanner attachment device 30 is configured to removably couple thereto a barcode reader 40. The barcode scanner attachment device 30 is preferably formed from a plastic. Alternatively, materials compatible to the operator and application may be used for the barcode scanner attachment device as they are a matter of design choice known to those skilled in the art.

Figure 1D:
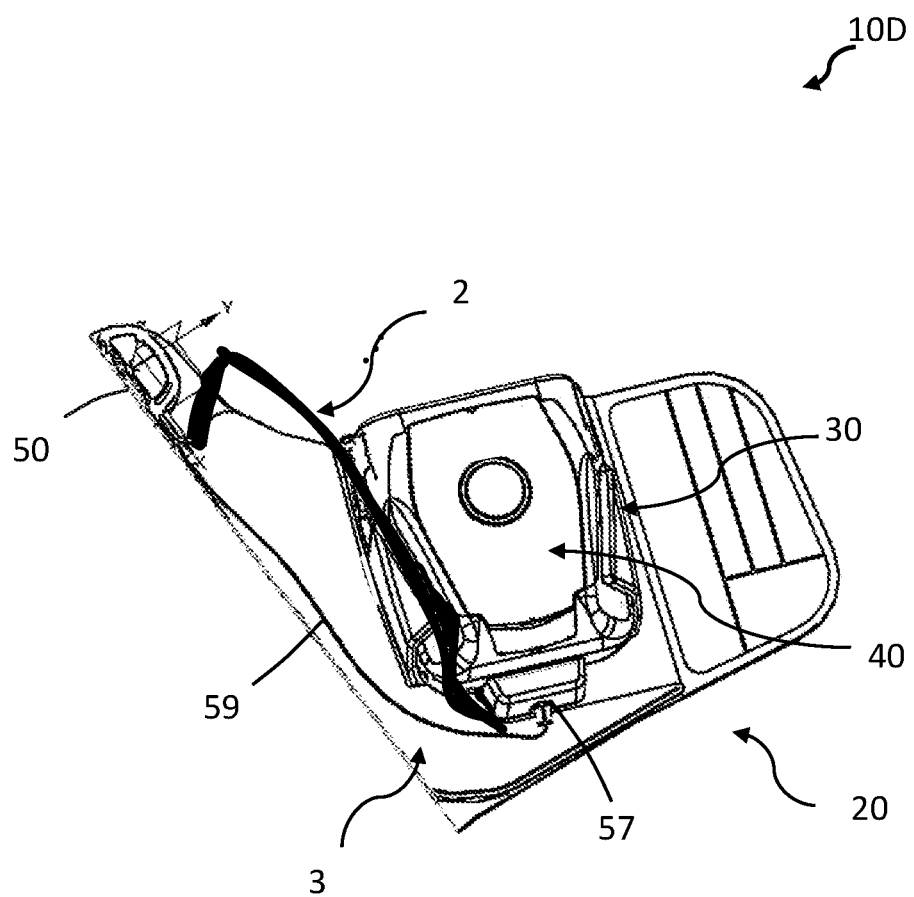

The trigger device 50 is attached on the back side of the back of the hand portion 24 of the flexible body 20. The trigger device may be a push button switch. Alternatively, the trigger device may be a digital sensor. The design of a trigger device for use with this disclosure is a design choice well known to those skilled in the art. Illustratively, adhesive material may be applied to a bottom surface of the trigger device to adhere the trigger device 50 to the wearable 20. Alternatively, attachment may be by means of Velcro adhesive tape. The attachment of the trigger device to the wearable is a matter of design choice and any means—adhesive or otherwise—may be used. As depicted in FIG. 1D, the trigger device 50 is electrically coupled via wire lead 59 to a trigger port 57 of the barcode scanner attachment device 30.

The nonvolatile memory device 60 is attached on the back side of the back of the hand portion of the flexible body. The nonvolatile memory device 60 may be an EEPROM, flash memory, embedded memory, or any other memory device that holds data stored in memory when power to the nonvolatile memory device is turned off. Illustratively, the EEPROM may be an EEPROM made by Microchip known as the "Single-Wire EEPROM" One set of specifications on the Single-Wire EEPROM is found at https://www.microchip.com/enus/products/memory/serial-eeprom/single-wire-and-uniobus-serial-eeproms, which is incorporated herein by reference.

As previously indicated, the "nonvolatile memory" is a type of computer memory that can retain stored information even after power is removed. The nonvolatile memory device 60 is one or more nonvolatile memory cells or a nonvolatile memory chip or a nonvolatile memory integrated circuit including one or more nonvolatile memory cells or a nonvolatile memory chip, together with circuit elements connected thereto that carry out memory hierarchy functions in association with the nonvolatile memory cells or nonvolatile memory chip, such as control circuits for memory sequencing, input protection circuits, interface circuits, and so on. The nonvolatile memory device 60 may be for example an EEPROM, NAND flash, NOR flash, MRAM, FeRAM, and so on. The nonvolatile memory device 60 may be implemented in different ways including employing a volatile memory chip supported by a small backup battery or super-capacitor. The power supplied by the battery or capacitor may be used to provide power to the volatile memory integrated circuit to maintain data on the volatile memory when the volatile memory integrated circuit is switched off.

Figure 1E:
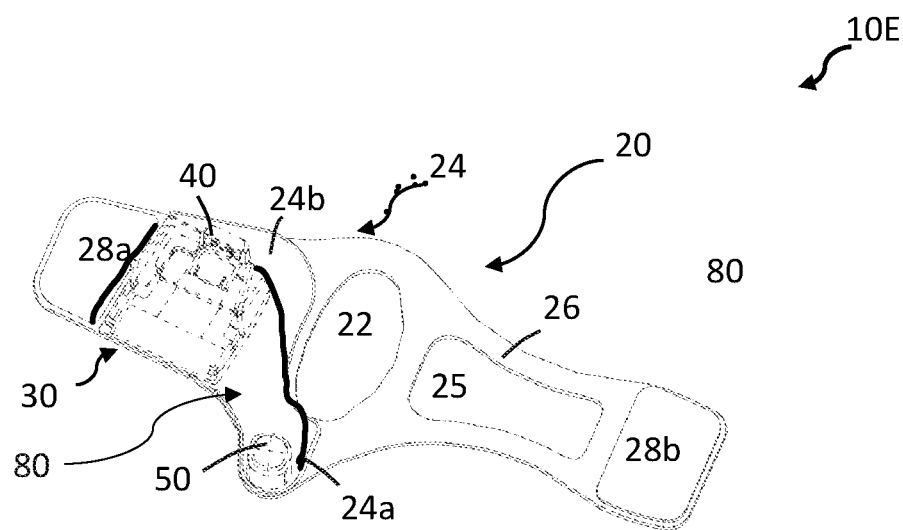

Preferably, the nonvolatile memory device 60 is attached to the wearable anywhere within a preferred footprint 80 of the wearable as depicted in FIG. 1E. Alternatively, the memory device 60 may be attached to the wearable outside the preferred footprint. Illustratively, the memory device may reside on a printed circuit board as depicted in FIG. 2. While illustrative embodiments have disclosed a nonvolatile memory device of this disclosure to be mounted to a printed circuit board, it will be appreciated that the nonvolatile memory device may be configured without a printed circuit board. For example, the nonvolatile memory device may be fabricated in the form factor of flexible electronics and mounted onto the wearable.

Referring back to FIG. 1, illustratively, adhesive material may be applied to an underside of a printed circuit board on which the nonvolatile memory device 60 may reside or to a flexible memory device electronic to adhere the nonvolatile memory device 60 to the wearable 20. Alternatively, attachment of the printed circuit board or flexible electronic to the wearable may be by means of Velcro adhesive tape. The attachment of the nonvolatile memory device 60 to the wearable 20 is a matter of design choice and any means— adhesive or otherwise—may be used. The nonvolatile memory device is electrically coupled via wire leads (162 in FIG. 2) to a memory port 233 (shown in FIG. 3) of the barcode scanner attachment device 30.

In FIG. 1D, an outer layer 2 of wearable 20 is depicted peeled back from lower layer 3 to show the wire 59 running therebetween in this embodiment.

The nonvolatile memory device stores hand wearable, barcode scanner, or both specific information includes one or more data (some data illustratively shown in FIG. 9B) indicative of the life of the hand wearable, the life of a scanner operatively coupled to the barcode scanner attachment device, or both. The data may include operator identification, operator name, make/model of wearable, make/model of scanner connected thereto. The data may include wearable use time, scanner run time, number of activations, pressure applied during an activation, time of activation, number and type of scanners used before failure, and so on. These are but illustrative but not limiting examples of the type of data that may be stored on the nonvolatile memory of this disclosure. The types of data storable on the nonvolatile memory of this disclosure may be any data that may be useful to the operation of the wearable, barcode scanner attached thereto, or the barcode scanning system whether networked or not in which the wearable with barcode scanner attached thereto may be connected thereto by wire or wirelessly.

The nonvolatile memory device holds the stored hand wearable, barcode scanner, or both specific information when power to the nonvolatile memory device is turned off.

The nonvolatile memory device makes the stored hand wearable, barcode scanner, or both specific information available when the power to the nonvolatile memory device is turned on.

Referring now to FIG. 2, FIGS. 2A, 2B, 2C (collectively FIG. 2) depict illustrative configurations of nonvolatile memory device in the hand wearable with auto recognition of this disclosure.

Figure 2A:
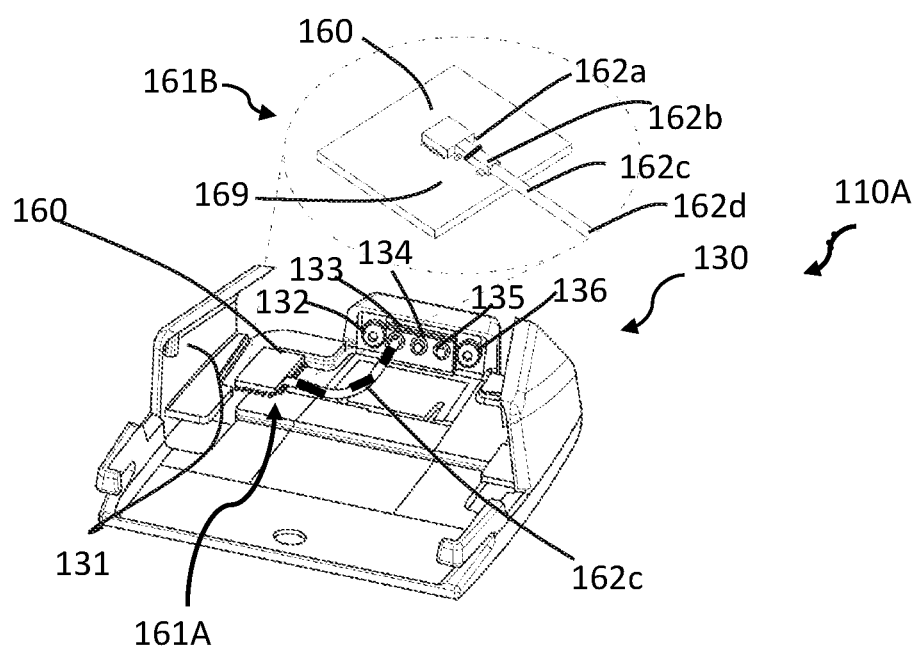
FIGS. 2A, 2B, 2C (collectively FIG. 2) depict illustrative configurations of nonvolatile memory device in the hand wearable with auto recognition of this disclosure.

FIG. 2A depicts a first embodiment 110A of the nonvolatile memory device disclosed herein. In this embodiment, nonvolatile memory device 160 is mounted to a printed circuit board 169. Traces (not shown) printed on the printed circuit board 169 provide wire leads for electrically connecting pins on the nonvolatile memory device 160 to a socket 162a on the printed circuit board configured for receiving a connector 162b. Mounting of a memory chip 160 to the printed circuit board, the layout and running of traces on the printed circuit board, and the socket 162a and its connection to the traces on the printed circuit board are a design choice well known to those skilled in the art. A wire lead 162c is provided at a first end with a connector 162b received by the socket 162a on the printed circuit board 169. At a second end 162d of the wire lead 162c, the wire lead 162c is electrically connected to a trigger port 134 on the barcode scanner attachment device 130. FIG. 2A shows the wire lead 162C in phantom since the wire lead is illustratively configured to lie beneath and/or run in grooves provided along an outside or inside surface of the barcode scanner attachment device 130 so as to not interfere with the engagement of a barcode scanner to the barcode scanner attachment device 130. Alternatively, a second end of the wire lead 162d may be provided with a connector for connection to the trigger port 133 on the barcode scanner attachment device 130 which in this alternative embodiment is in the form factor of a socket. Electrical contacts 132 and 136 on the barcode scanner attachment device 130 provide the positive and ground posts required for operation of the nonvolatile memory device 160 and the trigger device 150.

Figure 2B:
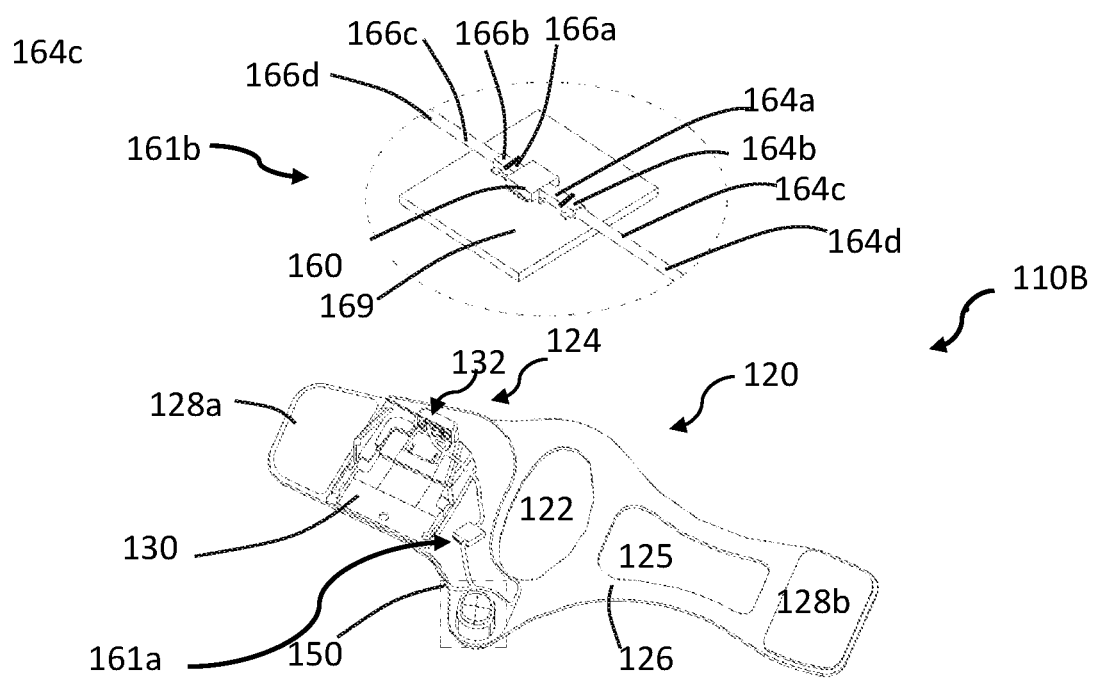

FIG. 2B depicts a second embodiment 110b of the nonvolatile memory device disclosed herein. In this embodiment, nonvolatile memory device 160 is mounted to a printed circuit board 169. Traces (not shown) printed on the printed circuit board 169 provide wire leads for electrically connecting pins on the nonvolatile memory device 160 to a socket 164a configured for receiving a connector 164b and to a socket 166a configured for receiving a connector 166b. Mounting of a memory chip 160 to the printed circuit board, the layout and running of traces on the printed circuit board, and the sockets 164a, 166a and its connection to the traces on the printed circuit board are a design choice well known to those skilled in the art. A first wire lead 164c is provided at a first end with a connector 164b received by the socket 164a. A second wire lead 166c is provided at a first end with a connector 166b received by the socket 166a. At a second end of the wire lead 164d, the wire lead 164c is electrically connected to a trigger port 134 on the barcode scanner attachment device 130. At a second end of the wire lead 166d, the wire lead 166c is electrically connected to a trigger device 150. As in FIG. 2A, the wire lead 164c is illustratively configured to lie beneath and/or run in grooves provided along an outside or inside surface of the barcode scanner attachment device 130 so as to not interfere with the engagement of a barcode scanner to the barcode scanner attachment device 130. Alternatively, the second end of the wire lead 164d may be provided with a connector for connection to the trigger port 133 on the barcode scanner attachment device 130 in the form factor of a socket provided. Likewise, the second end of the wire lead 166d may be provided with a connector for connection to a trigger port on the trigger device wherein the trigger port is in the form factor of a socket. Electrical contacts 132 and 136 on the barcode scanner attachment device provide the positive and ground posts required for operation of the nonvolatile memory device 160 and the trigger device. In this embodiment, the signals from both the trigger device and the nonvolatile memory device communicate along wire lead 166c by way of a multiplexing protocol (FIG. 8B).

Figure 2C:
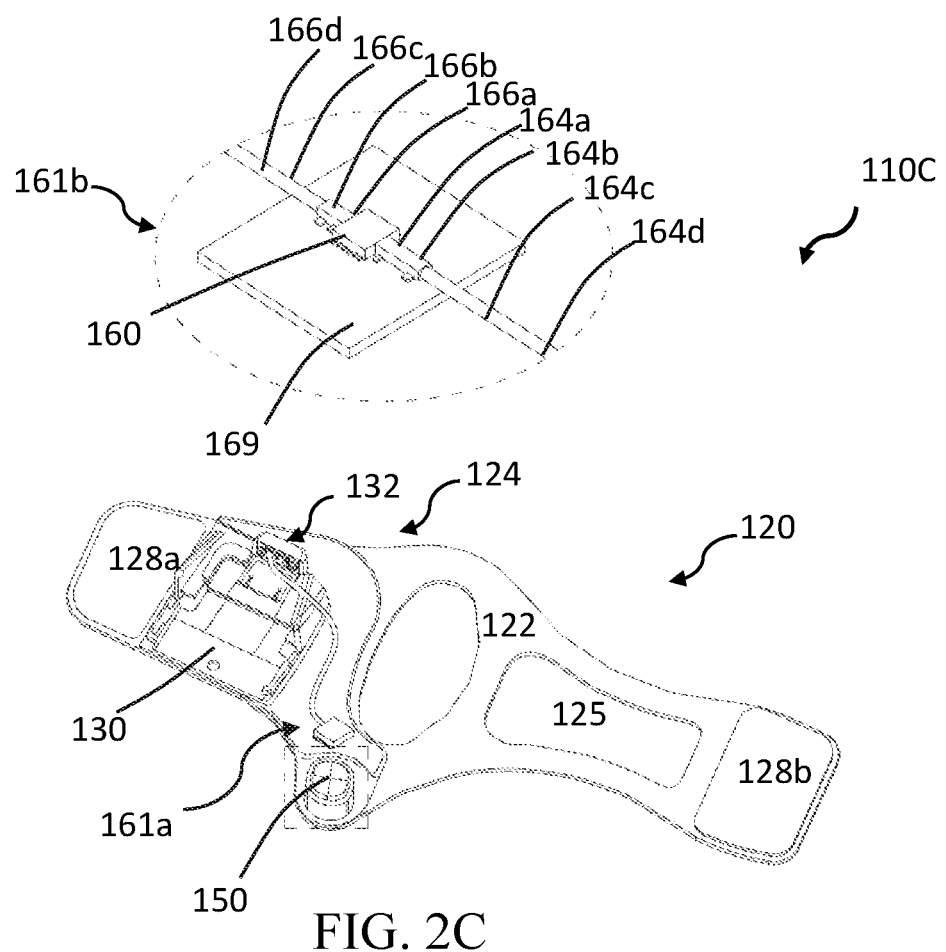

FIG. 2C depicts a third embodiment 110C of the nonvolatile memory device disclosed herein. In this embodiment, nonvolatile memory device 160 is mounted to a printed circuit board 169. This embodiment is similar to the second embodiment depicted in FIG. 2B, and the components and their function bear the same numbering of the elements except that the nonvolatile memory device resides in close proximity to the trigger device 150 and the wire lead 166c is electrically connected to a trigger device 150. As in FIG. 2A, the wire lead 164c is illustratively configured to lie beneath and/or run in grooves provided along an outside or inside surface of the barcode scanner attachment device 130 so as to not interfere with the engagement of a barcode scanner to the barcode scanner attachment device 130. Alternatively, a second end of the wire lead 164d may be provided with a connector for connection to the trigger port 134 on the barcode scanner attachment device 130 wherein the trigger port 134 is in the form factor of a socket provided. Likewise, a second end of the wire lead 166d may be provided with a connector for connection to a trigger port on the trigger device wherein the trigger port is in the form factor of a socket.

In an alternative embodiment to the one depicted in FIG. 2C, the nonvolatile memory device resides inside the trigger design. In this embodiment, the trigger device is configured with the nonvolatile memory device. That is to say, the nonvolatile memory device is integrated into the trigger device.

Figure 3A:
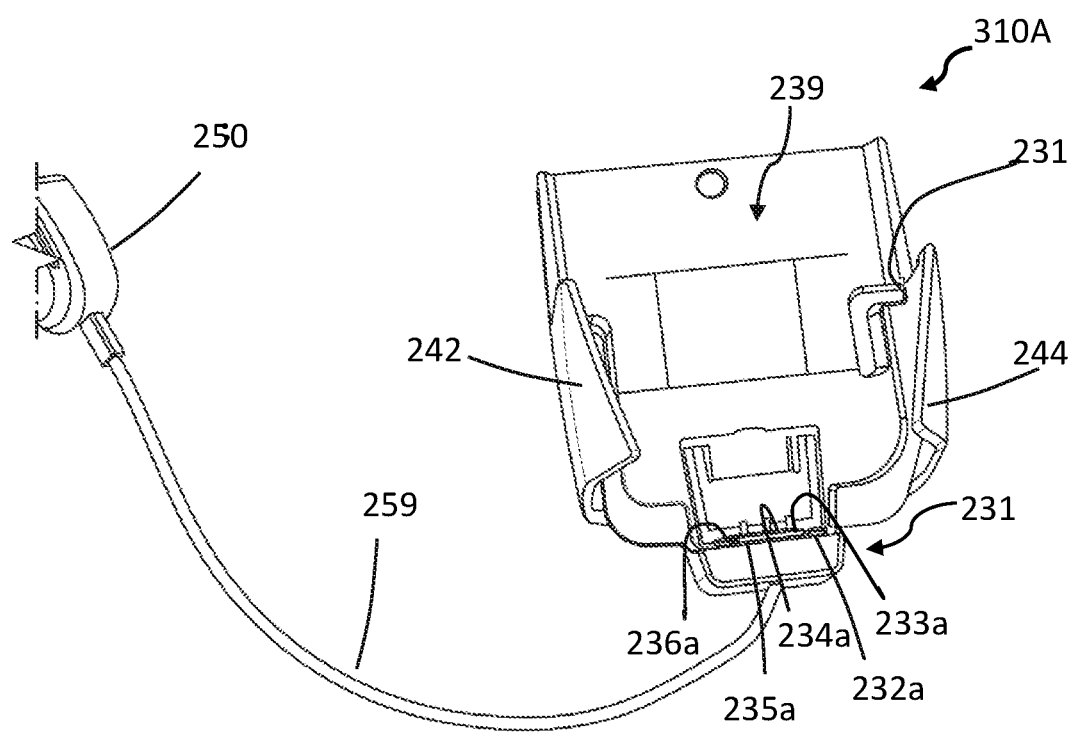
FIGS. 3A, 3B, 3C (collectively FIG. 3) depict illustrative barcode scanner attachment device in the hand wearable with auto recognition of this disclosure.
Figure 3B:
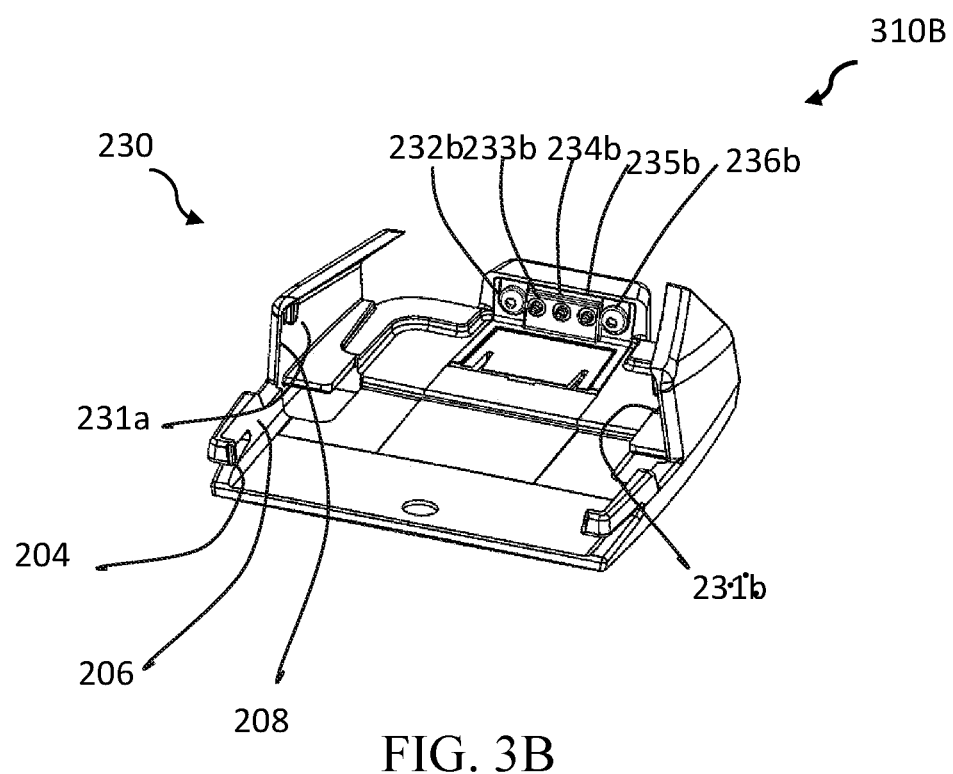
Figure 3C:
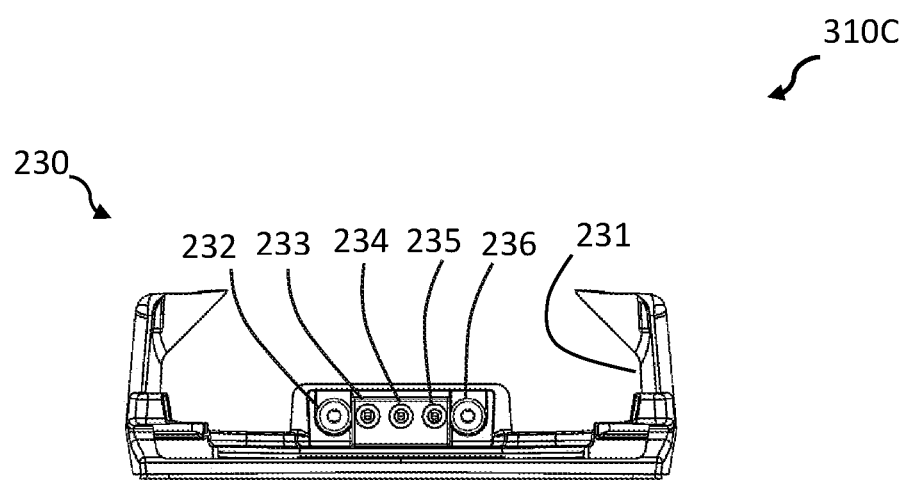

FIGS. 3A, 3B, 3C (collectively FIG. 3) depict illustrative barcode scanner attachment device in the hand wearable with auto recognition of this disclosure.

The barcode scanner attachment device (310A, 310B, 310C) includes a bottom surface 239, sidewalls 242, 244, and a connector panel 232. The bottom surface 239 and the sidewalls 242, 244 are configured to receive and releasably hold a barcode scanner. More specifically, the bottom surface 239 provides a support platform for receiving a bottom of the barcode scanner and holding the barcode scanner to the wearable of this disclosure. The inside surface 231a, 231b of the sidewalls 242, 244 provide a friction fit for securely holding sidewalls of a barcode scanner that is slipped into the opening of the barcode scanner attachment device formed by the bottom surface 239 and sidewalls 242, 244.

The connector panel 231 include electrical ports sufficient for providing the electrical connectivity between the scanner on the scanner side of the connector panel and the components on the other side of the connector panel—namely, the trigger device 250, a nonvolatile memory device of this disclosure connected thereto, or other devices or components such as may be adapted to the wearable. In the illustrative embodiment depicted in FIG. 3A, the connector panel 232 includes positive and negative contact ports 232a,b, 236a,b, a port 233a,b for connection of the nonvolatile memory device of this disclosure, and a trigger port 234a,b for connection of the trigger device. The port 235a,b is not used in this example. Thus, positive and negative contact ports 232a, 236a connect to positive and negative contact points on the barcode scanner; nonvolatile memory device port 233a connects to a memory port on the barcode scanner, trigger port 234a connects to a trigger port on the barcode scanner, and so on.

Adhesive material may be applied to a bottom surface of the barcode scanner attachment device to adhere the barcode scanning device to the wearable 20. Alternate means for securing a barcode scanner attachment device to a wearable like Velcro may also be used. The securement of a barcode scanner attachment device to a wearable is a design choice well known to those skilled in the art.

Similarly, positive and negative contact ports 232b, 236b make available positive and negative contact points to the components connected to the barcode scanner attachment device; nonvolatile memory device port 233b connects to the nonvolatile memory device on the wearable of this disclosure; trigger port 234b connects to the trigger device on the wearable, and so on.

FIG. 4 depicts bottom side 410 of illustrative wearable for use with an illustrative embodiment of hand wearable with auto recognition. The flexible body 320 includes a thumb opening 322, a back of the hand portion 324, a palm of the hand portion 326, and means for securing (328a, 28b) the flexible body 320 about a hand. These elements are similar to and function similar to those described in connection with FIG. 1. The elements bear the same numbering as like elements depicted in FIG. 1 increased by 300; and the description of those like elements in FIG. 1 apply to the elements provided in FIG. 4.

Figure 5A:
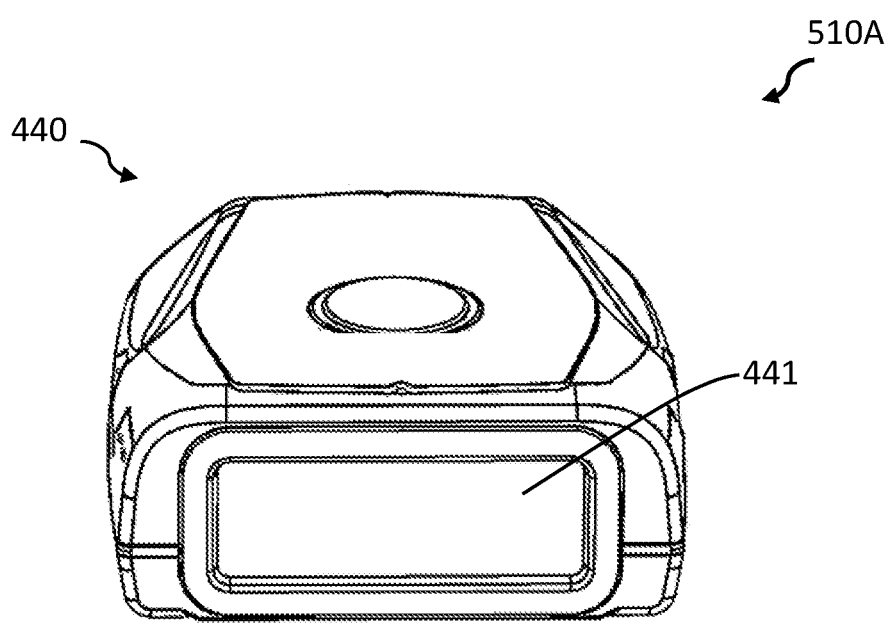
FIGS. 5A, 5B, 5C (collectively FIG. 5) depict illustrative barcode scanner useable in the hand wearable with auto recognition of this disclosure.
Figure 5B:
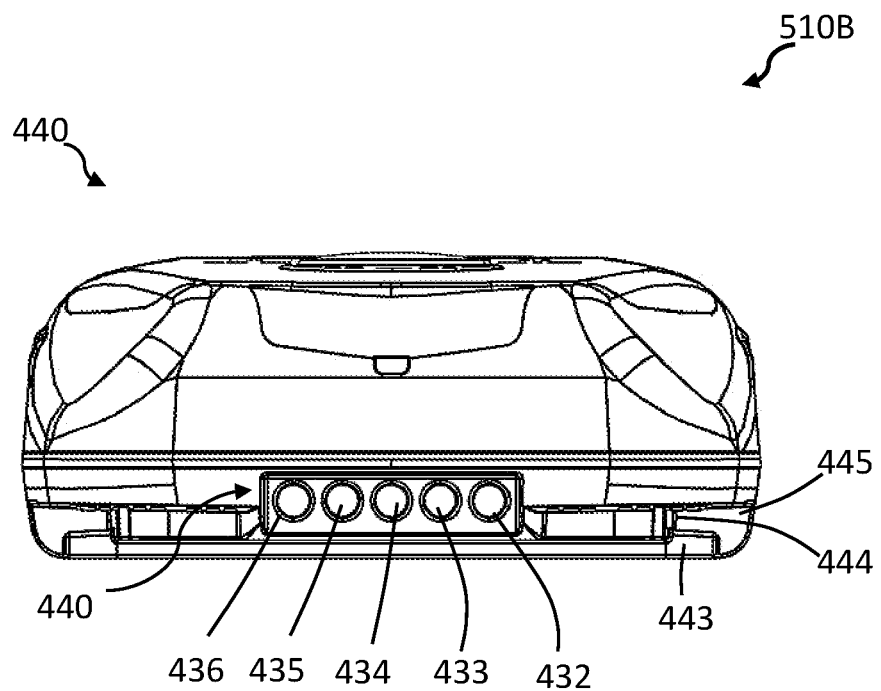
Figure 5C:
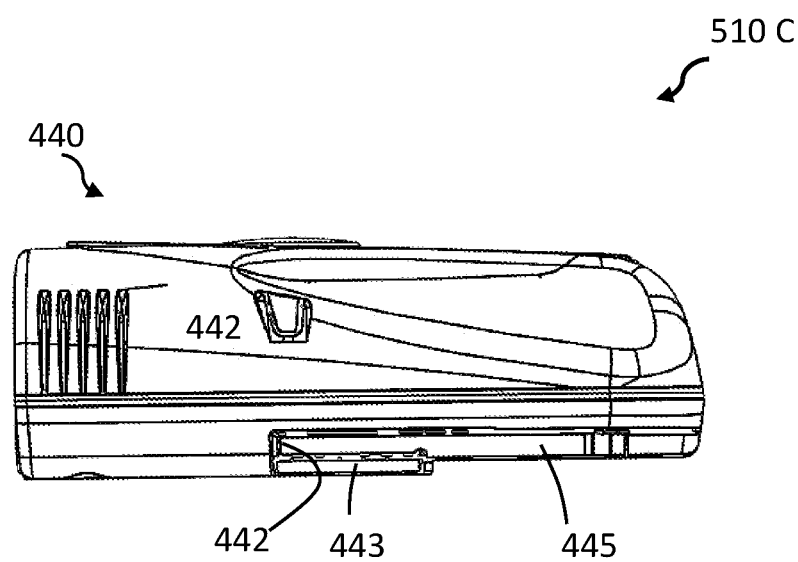

FIGS. 5A, 5B, 5C (collectively FIG. 5) depict illustrative barcode scanner useable in the hand wearable with auto recognition of this disclosure. The barcode scanner 440 includes a scanner window 441, sidewalls 442, and a control panel 440. The scanner window 441 provides a transparent panel through which a beam of light generated by the barcode scanner may pass to and from a barcode to read the barcode.

The sidewalls 442 (only one is shown but the other side is typically similar) are received by the sidewalls 242, 244 of the barcode scanner attachment device which hold the barcode scanner to the barcode scanner attachment device as previously explained. As depicted in FIG. 5C, the sidewalls 442 may be provided with an inner wall 445, a partial outer wall 443 and stop 444. The partial outer wall 443 slides along a slot 204 provided in the barcode scanner attachment device, the inner wall 445 slides along an inner wall 208 of the barcode scanner attachment device, and stop 444 comes to a stop at edge 208 to provide a tighter engagement between the barcode scanner and the barcode scanner attachment device.

Referring to FIG. 5B, contact points 432, 436 on the barcode scanner 440 provide positive and negative contacts for connection to ports 232a, 236a of the barcode scanner attachment device explained in connection with FIG. 3. Port 433 provides a memory port for connection to the nonvolatile memory device port 233a of the barcode scanner attachment device explained in connection with FIG. 3. Port 434 provides a trigger port for connection to the trigger port 234a of the barcode scanner attachment device explained in connection with FIG. 3.

Figure 6A:
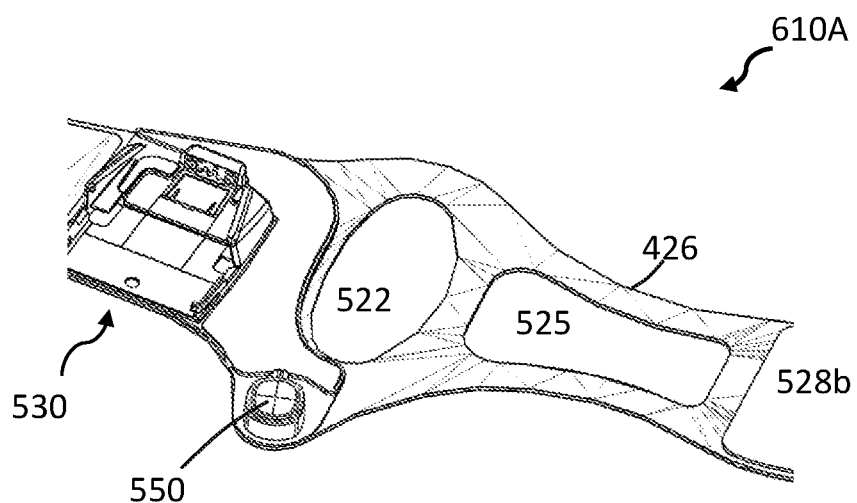
FIGS. 6A, 6B (collectively FIG. 6) depict illustrative hand wearable with auto recognition of this disclosure with and without barcode scanner.
Figure 6B:
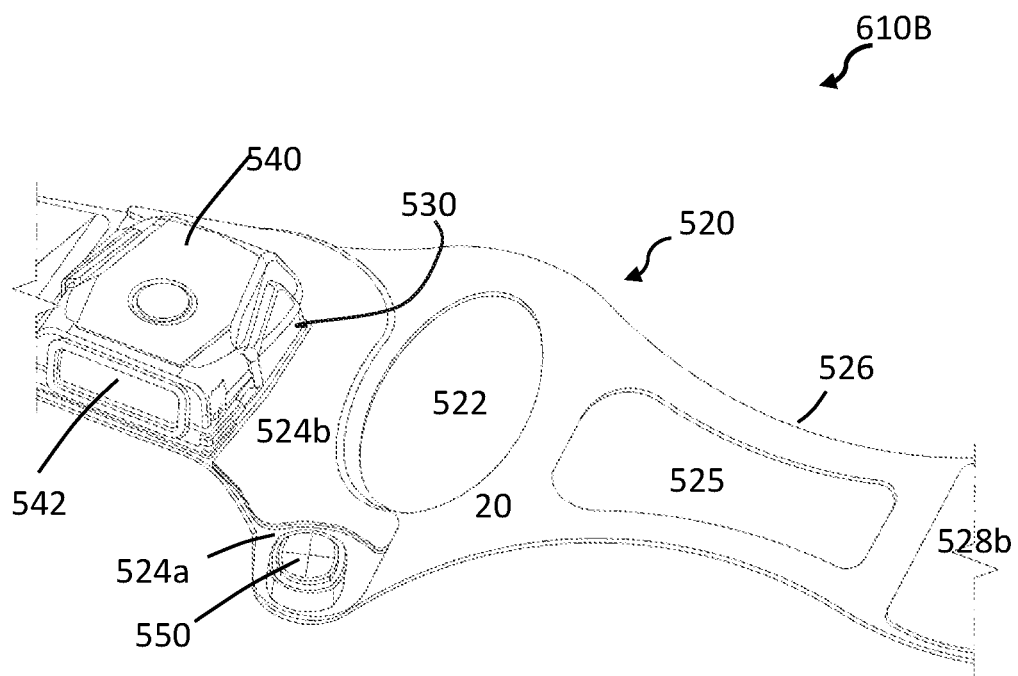

FIGS. 6A, 6B (collectively FIG. 6) depict illustrative hand wearable with auto recognition of this disclosure with and without barcode scanner. FIG. 6A shows the hand wearable of this disclosure before attachment of a barcode scanner. FIG. 6B shows the hand wearable of this disclosure with a barcode scanner attached. The elements function like and their element numbers are the same numbers increased by 500 as depicted and explained in connection with FIG. 1.

Figure 7A:
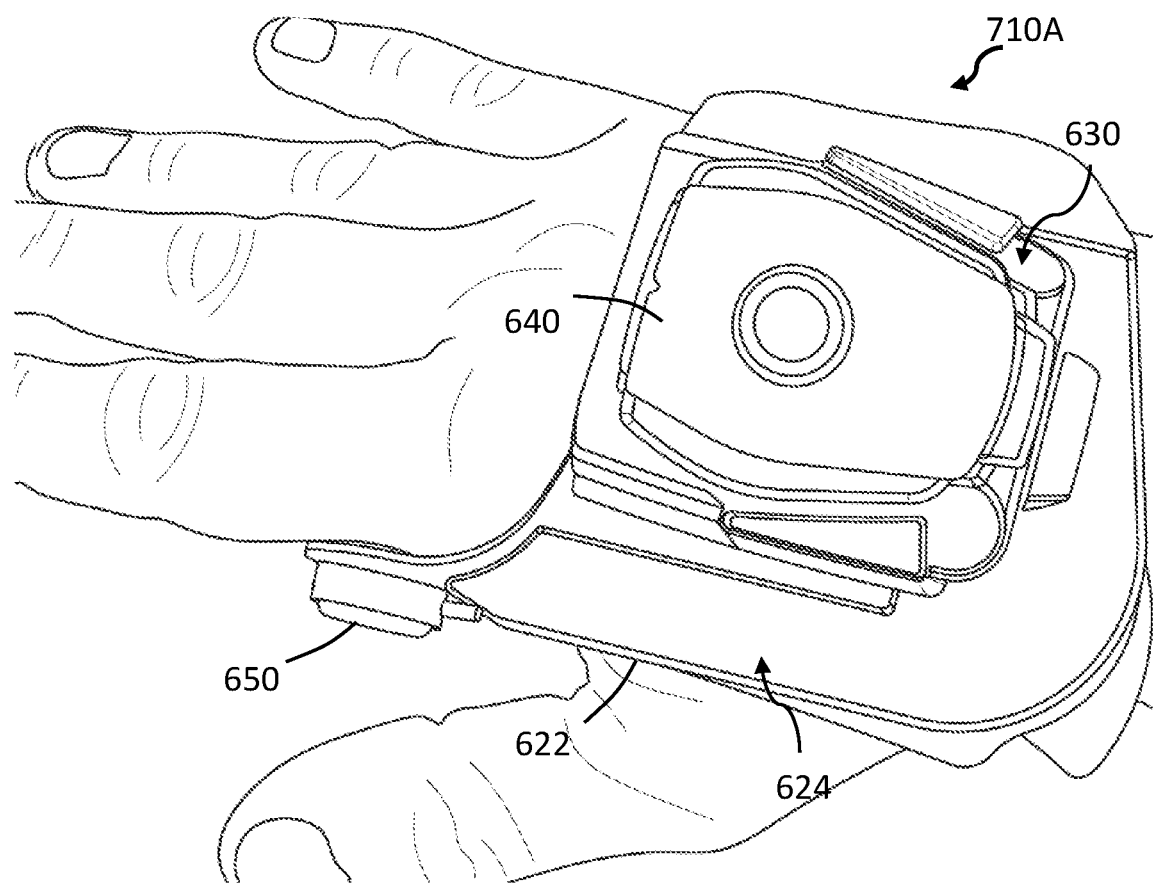
FIGS. 7A, 7B (collectively FIG. 7) depict illustrative hand wearable with auto recognition of this disclosure as worn on a hand of an operator.
Figure 7B:
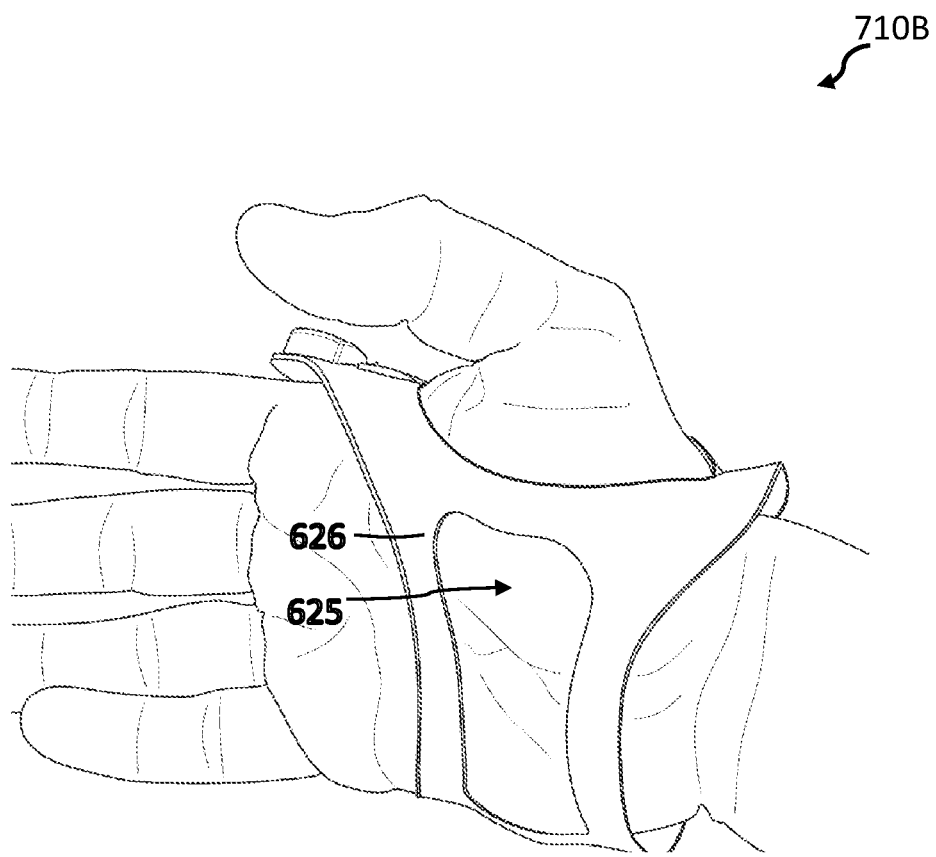

FIGS. 7A, 7B (collectively FIG. 7) depict illustrative hand wearable with auto recognition of this disclosure as worn on a hand of an operator. FIG. 7A shows an aerial view of the hand wearable of this disclosure and FIG. 7B depicts a bottom view. The elements shown in FIG. 7 function like and their element numbers are the same numbers increased by 600 as depicted and explained in connection with FIG. 1. As seen in FIG. 7A, the hand wearable of this disclosure is placed onto the hand of an operator by slipping the thumb through opening 622. As seen in FIG. 7B, The palm of the hand is visible through opening 625. The opening 625 exposes the hand to allow the operator to have a better touch, feel of objects picked up, held in, or otherwise manipulated by the hand. The opening 625 also allows the skin of the hand to breath to provide a better working environment for the hand. The hand wearable is held to the hand of the operator illustratively by the means for securing (28a, 28b) the flexible body 20 about a hand as previously explained in connection with FIG. 1.

Figure 8A:
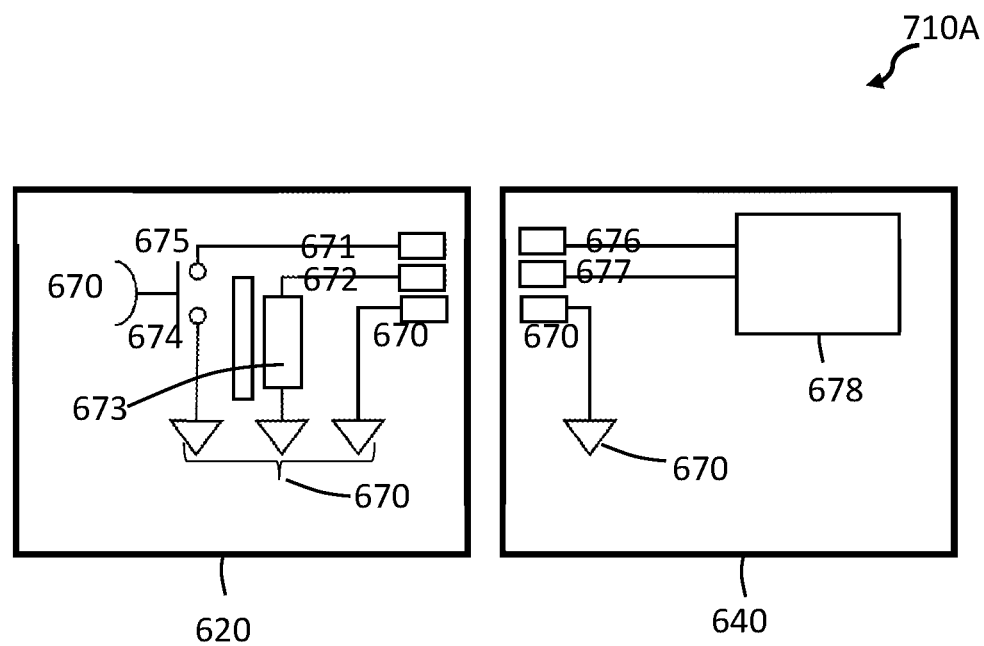
FIGS. 8A, 8B, 8C (collectively FIG. 8) depict illustrative electrical connections between a barcode scanner attachment device and a barcode scanner in the hand wearable with auto recognition of this disclosure.
Figure 8B:
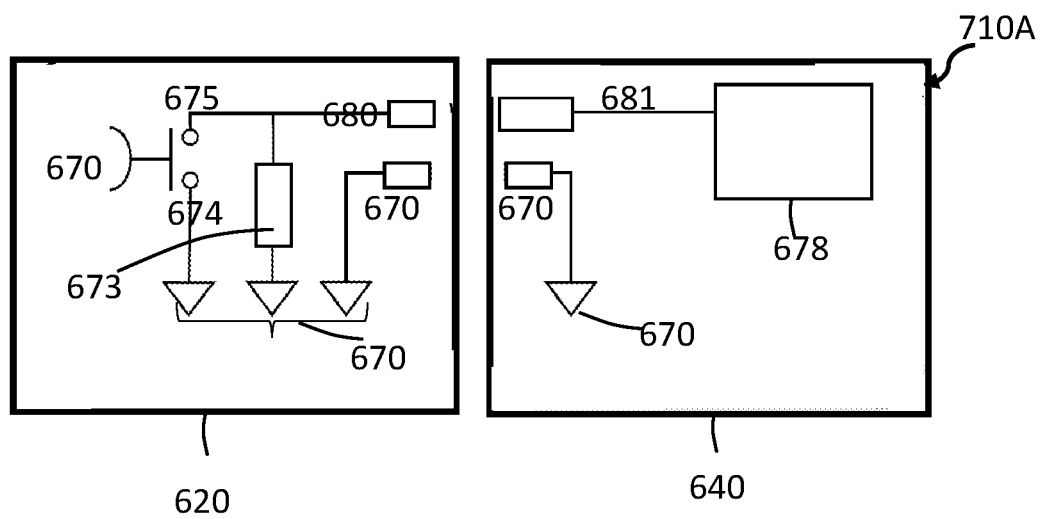
Figure 8C:
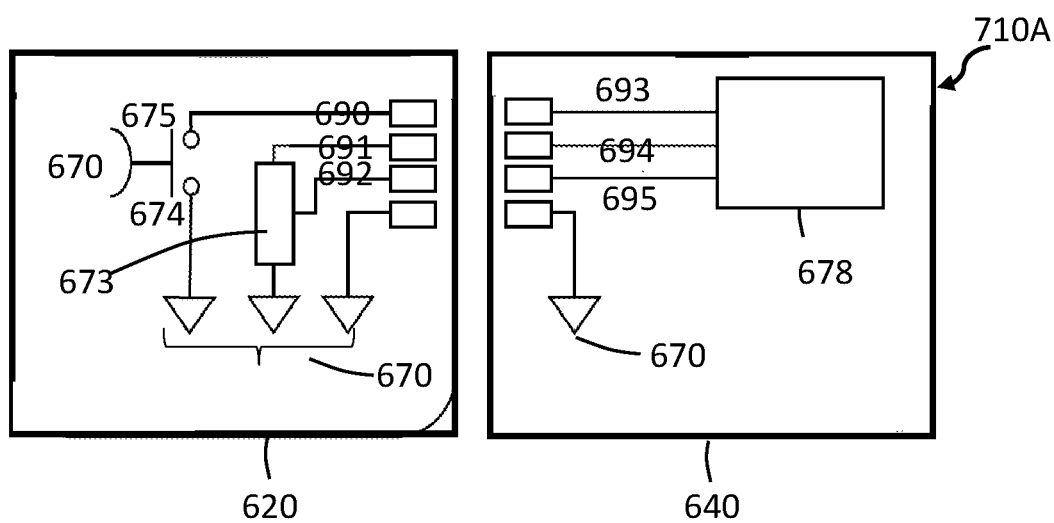

FIGS. 8A, 8B, 8C (collectively FIG. 8) depict illustrative electrical connections between a barcode scanner attachment device and a barcode scanner in the hand wearable with auto recognition of this disclosure.

FIG. 8A shows a wearable 620 of this disclosure in combination with a scanner 640. The wearable includes a trigger device 670 with a positive pole 675 and a negative pole 674 connected to ground 670. The positive pole 675 is electrically coupled to contact 671 of the wearable 620 which mates with contact 676 of the barcode scanner 640 to complete a circuit wherein the scanner reads the state of trigger device 670 and detects activation of the trigger device 670 by execution of instructions by application processor 678 of the barcode scanner. The wearable includes a nonvolatile memory device 673 of this disclosure which is in electrical communication with contact 672 of the wearable 620 which mates with contact 677 of the scanner to complete a circuit wherein the scanner reads the nonvolatile memory device 673, or writes to the nonvolatile memory device 673 by execution of instructions by application processor 678 of the barcode scanner. The nonvolatile memory device 673 is grounded 670 as is electrical contacts 670 on both the wearable 620 and the barcode scanner 640.

FIG. 8B shows an alternative embodiment of a wearable 620 of this disclosure in combination with a scanner 640. The tTrigger device 670 and ground contacts and elements function like and their element numbers are the same as depicted and explained in connection with FIG. 8A except that here the nonvolatile memory device 673 of this disclosure is in electrical communication with the barcode scanner 640 over the same contact 680 that is used by the positive pole of the trigger device 670. More specifically, the signals generated by the trigger device 670 and the nonvolatile memory device 673 in this example are multiplexed together for communication over a single contact. Multiplexing of the signals may be accomplished by a multiplexing program executed by the application processor 678 and is a design choice well known to those skilled in the art.

FIG. 8C shows an alternative embodiment of a wearable 620 of this disclosure in combination with a scanner 640. The trigger device 670 and nonvolatile memory device and ground contacts and elements function like and their element numbers are the same as depicted and explained in connection with FIG. 8A except that here the nonvolatile memory device 673 of this disclosure, in addition to being in contact with the barcode scanner 640 through a contact point 691, is also in electrical contact with the barcode scanner 640 through a serial port contact 692. In this embodiment, the barcode scanner 640 may communicate with the nonvolatile memory device 673 of this disclosure via parallel, serial, or both communication protocols.

The foregoing embodiments are illustrative only; and additional or other contacts may be provided between the wearable of this disclosure and the scanner to provide for additional channels of communication between the scanner and the hand wearable of this disclosure.

Figure 9A:
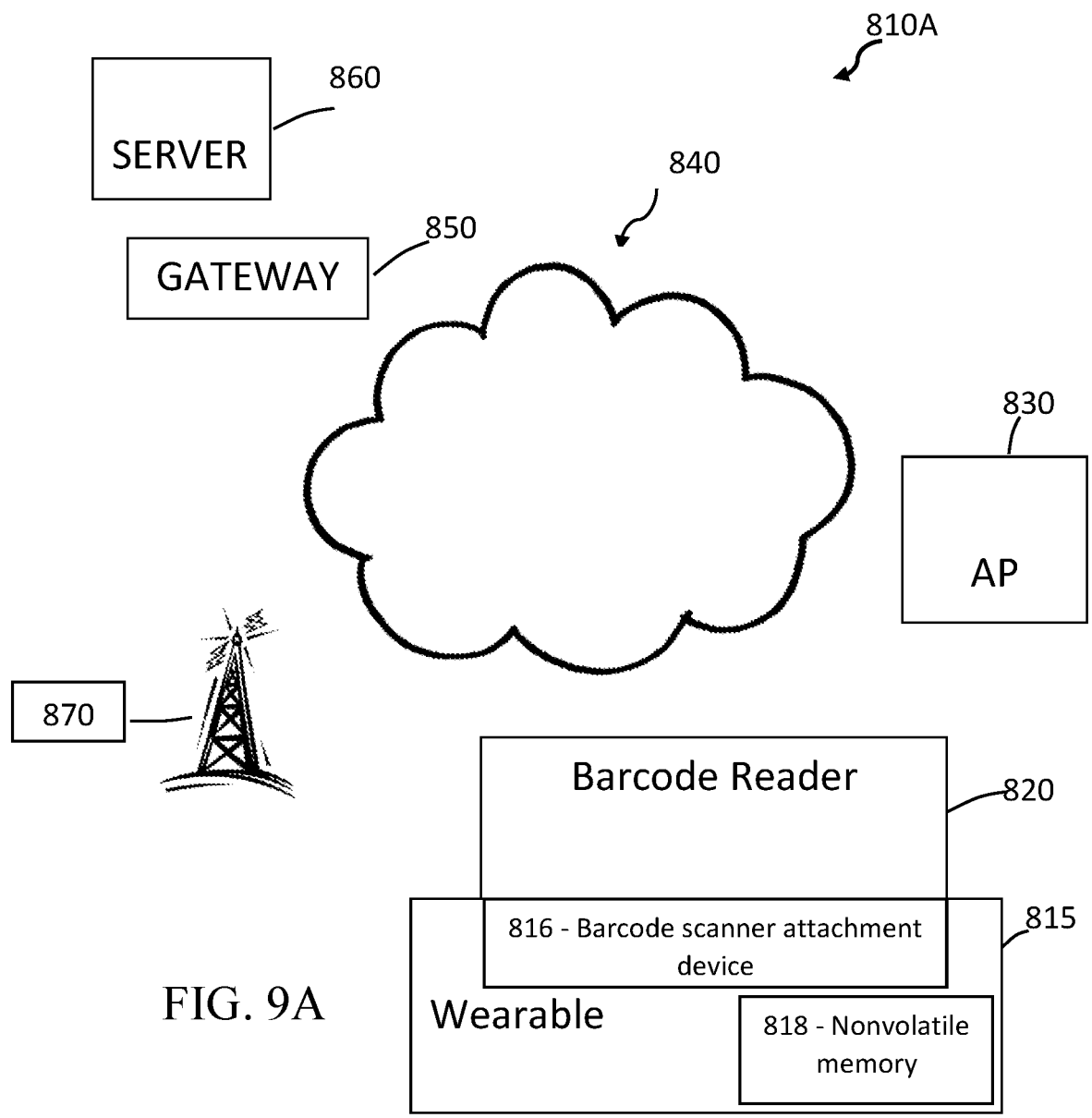
FIGS. 9A, 9B (collectively FIG. 9) depict use of illustrative hand wearable with auto recognition of this disclosure in a predictive action protocol wherein the barcode scanner, an online cloud server, or both track and compare hand wearable, barcode scanner, or both specific information against usage and failure rate specifications on the hand wearable, barcode scanner, or both.
Figure 9B:
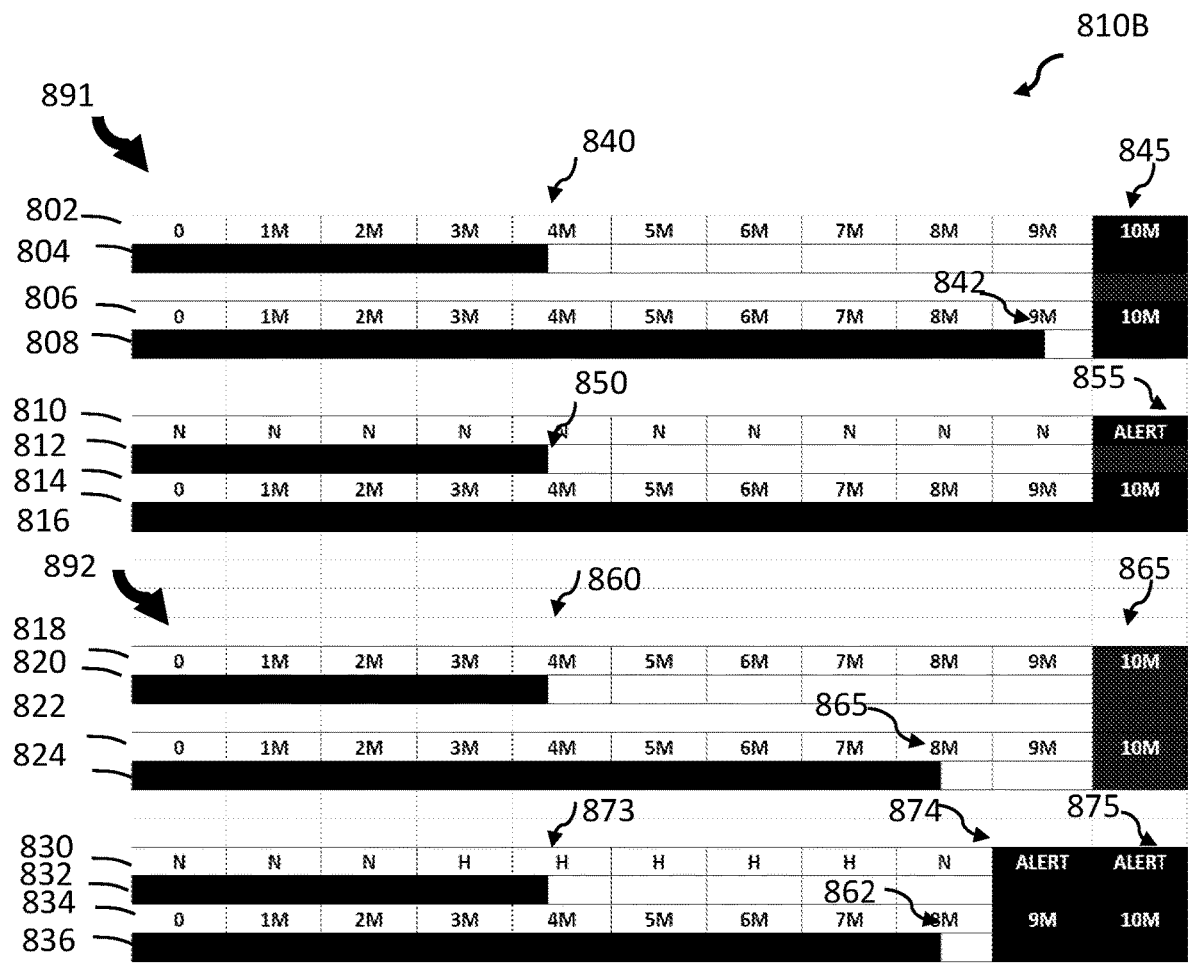

FIGS. 9A, 9B (collectively FIG. 9) depict use of illustrative hand wearable with auto recognition of this disclosure in a predictive action protocol wherein the barcode scanner, an online cloud server, or both track and compare hand wearable, barcode scanner, or both specific information against usage and failure rate specifications on the hand wearable, barcode scanner, or both.

As depicted in FIG. 9A, a barcode scanning device 820 is attached to a hand wearable glove with auto recognition of this disclosure 815 via the barcode scanning attachment device 816. Nonvolatile memory device 818 is in electrical communication with the barcode scanning device 820. Hand wearable, barcode scanner, or both specific information from the nonvolatile memory device 818 of the hand wearable is received at the barcode reader 820, an online cloud computer 850, or both. Transmission of hand wearable, barcode scanner, or both specific information from the nonvolatile memory device 818 of the hand wearable from the barcode reader 820 to the server 860 may be via access point 830, base station 870 through a cloud 840 and a gateway 850.

FIG. 9B depicts a predetermined predictive action protocol 810B implemented in software instructions stored in memory in either the barcode reader or the server executable by a processor in either the barcode reader or the server. The protocol 810B is devised in this illustrative embodiment for a trigger device rated for a specification life of 10 million trigger activations. Two illustrative examples 891, 892 are shown to illustrate a like trigger device being used in two different wearables by different operators. The protocol 810B provides a fuel gauge 802, 806 for number of activations in the first illustrative example 891 and a fuel gauge 818, 824 for number of activations in the second illustrative example. In both examples the fuel gauge is depicted in increments of 1 million up to the 10 million number of activations 845, 865. An alert 855, 875 have been determined for each illustrative example 891, 892.

The protocol tracks 804, 808 for the first illustrative example 891 and tracks 820 and 832 for the second illustrative example 892 the number of activations actually initiated by the trigger device in each illustrative example.

The protocol also tracks 812, 816 for the first illustrative example 891 and tracks 832, 836 for the second illustrative example the level of pressure detected for each activation of the trigger device. The detection of the level of pressure is illustratively detected by a pressure sensor. Alternatively, other sensors may be used for the detection.

In the first illustrative example 891, the protocol track 804 indicates 4.3 million activations detected by the trigger. At a later point in time, the protocol track 808 detects 9.5 million activations. In this illustrative example, the 9.5 million activations generate the alert 855. The instruction set for the protocol may reside on a barcode scanner used with the wearable of this disclosure, a cloud server to which the wearable may be connected through a barcode scanner connected thereto, or both. The alert may be generated wherever a processor executing the instruction set for the protocol reside. If the processor resides on the cloud server, the alert may be sent to the barcode reader for the barcode reader to generate an alert by display, a beeping sound, other audio or visual prompts, or combinations thereof. If the processor executing the alert instruction set resides on the barcode reader, the barcode reader may prompt a display, a beeping sound, other audio or visual prompts, or combinations thereof.

The protocol of this disclosure may track number of activations alone. Alternatively, the protocol may track level of pressure of the activations of the trigger device. The protocol may also track any other parameters associated with the wearable and/or trigger device. For example, the protocol may track the length of time that the wearable and/or trigger device have been in use and trigger an alert when that length of time has been reached. The protocol may track time of activations. The protocol may track the make and model of the wearable and/or trigger device and trigger alerts when the wearable and/or trigger device have been upgraded and need to be replaced. The protocol may track maintenance schedules for the wearable and/or trigger device and trigger alerts when the maintenance schedules have been reached. For instance, the protocol may include a glove and/or trigger inspection every million activations and trigger an alert each million activation increment of the wearable and/or trigger device.

The illustrative protocol 810B further illustrates application of the protocol in tracking levels of pressure on the trigger device. Specifically, fuel gauge 810 for the first illustrative example depicts the letter "N" at each 1 million activation increment of the trigger device. This indicates that the protocol has been detecting a level of activation that fits within the range of "normal" pressures of activations on which the specification life of the trigger device having 10 million activations is based. In fuel gage 830, the letter "N" is depicted at the 1 million and 2 million and 8 million increments; but the letter "H" appears at the 3 through 7 million increments. This means that the protocol has detected an application of pressure greater than the "normal" level of pressure for which the trigger device is rated. Since the higher level of pressure activations shortens the life span of the trigger device, the protocol has adjusted the alert 875 to a new alert 874 which is set at 9 million activations. In this example, once the trigger device reaches 8.5 million activations, the protocol generates the alert 874 to alert the operator, administrators of a system employing the wearable of this disclosure, and/or others that the trigger device has reached the point for replacement.

The embodiment depicted in FIG. 8 provides one illustrative example of the use of a nonvolatile memory device of this disclosure. The nonvolatile memory device of this disclosure may be implemented in a wide variety of applications. For example, such a nonvolatile memory device can be used for many purposes, for instance to store statistical data. The wearable device or the connected remote system can use stored data to predict specific situations and suggest possible actions (e.g. counting number of trigger pressures can be used to predict component failure and suggest glove replacement).

Any collection of statistical data about the usage of the hand wearable or the scanner may be stored by the nonvolatile memory device of this disclosure for the purposes sought to be served by this disclosure.

FIGS. 10A, 10B (collectively FIG. 10) depict use method for tracking the life of a hand wearable with auto recognition of this disclosure or such wearable together with a scanner used therewith in a predictive action protocol according to this disclosure.

FIG. 10A depicts a method for tracking the life of a hand wearable with auto recognition of this disclosure. FIG. 10B depicts a method for tracking the life of a hand wearable with auto recognition of this disclosure, a barcode reader used therewith, or both.

In the method for tracking the life of a hand wearable with auto recognition of this disclosure of FIG. 10A, the method starts by providing 920 a hand wearable with a barcode scanner attachment device and nonvolatile memory device storing hand wearable, barcode scanner, or both specific information on a hand wearable. A barcode reader is connected 922 to the barcode scanner attachment device. At the barcode reader is received 924 hand wearable, barcode scanner, or both specific information from the nonvolatile memory device of the hand wearable. The hand wearable, barcode scanner, or both specific information received from the nonvolatile memory device of the hand wearable is stored. 926. The failure rate or usage of the hand wearable with the hand wearable is tracked 928. A predetermined predictive action protocol is implemented 930 to determine failure of the hand wearable. When the predetermined predictive action protocol indicates an impending failure of the hand wearable, an alert is generated or sent 932 to the barcode reader.

In the method for tracking the life of a hand wearable with auto recognition of this disclosure, a barcode reader used therewith, or both of FIG. 10B, the method starts by providing 940 a hand wearable with a barcode scanner attachment device and nonvolatile memory device storing hand wearable, barcode scanner, or both specific information on the hand wearable and a barcode scanner attached thereto. A barcode reader is connected 942 to the barcode scanner attachment device. The barcode reader is connected 944 to an online cloud computer. The barcode reader, the online cloud computer, or both receive 946 hand wearable, barcode scanner, or both specific information from the nonvolatile memory device of the hand wearable. The hand wearable, barcode scanner, or both specific information received from the nonvolatile memory device of the hand wearable is stored. 948. The failure rate or usage of the hand wearable, a barcode scanner used with the hand wearable, or both is tracked 950. A predetermined predictive action protocol is implemented 930 to determine failure of the hand wearable, the barcode scanner, or both. When the predetermined predictive action protocol indicates an impending failure of the hand wearable or the barcode scanner, an alert is generated or sent 954 to the barcode reader.

Figure 11:
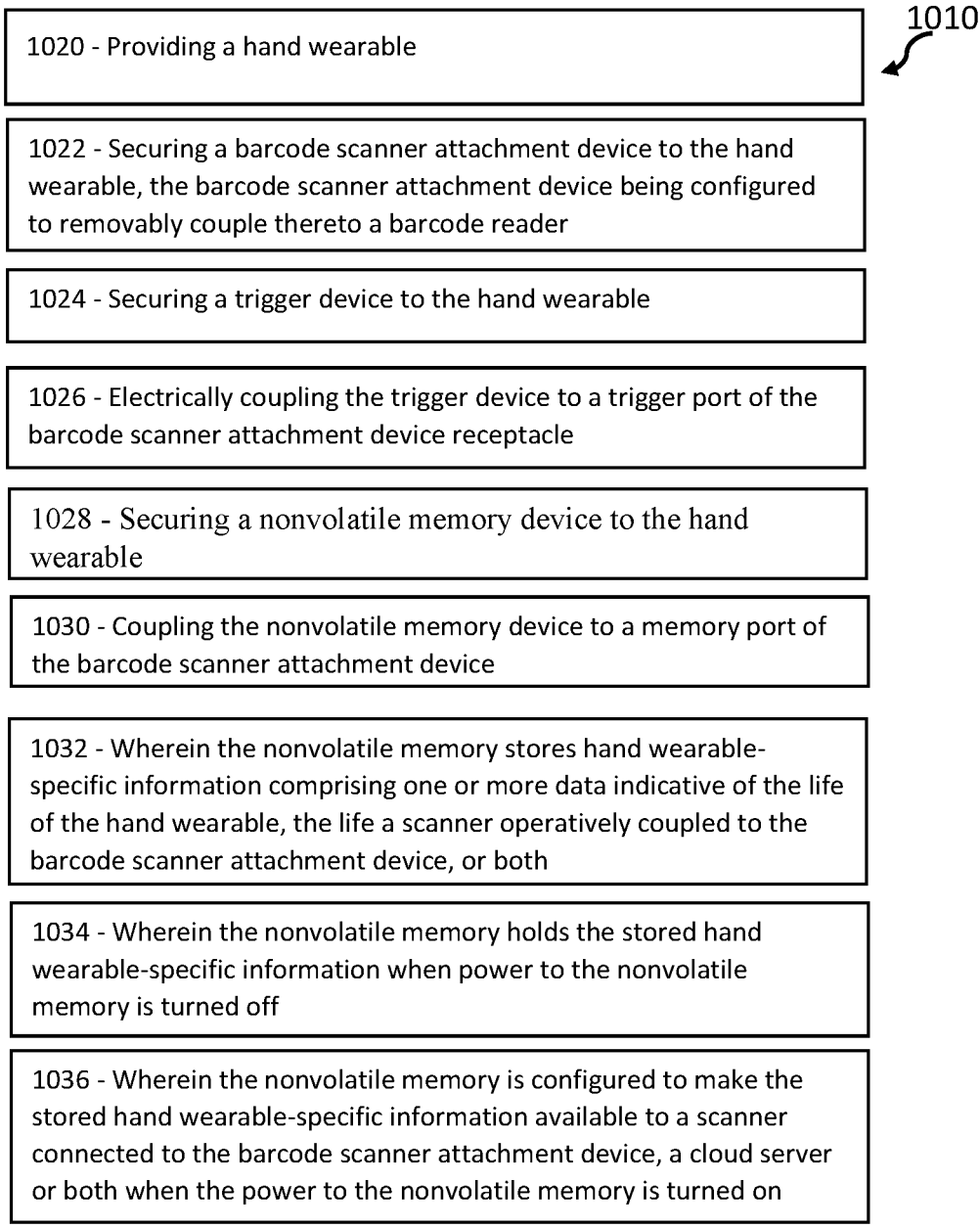
FIG. 11 depicts an illustrative method for making a hand wearable with auto recognition of this disclosure.

FIG. 11 depicts an illustrative method for making a hand wearable with auto recognition of this disclosure. The method starts by providing 1020 a wearable. A barcode scanner attachment device is secured 1022 to the hand wearable, the barcode scanner attachment device being configured to removably couple thereto a barcode reader. A trigger device is secured 1022 to the hand wearable. The trigger device is electrically coupled 1026 to a trigger port of the barcode scanner attachment device receptacle. A nonvolatile memory device is secured 1028 to the hand wearable. The nonvolatile memory device is coupled 1030 to a memory port of the barcode scanner attachment device. The nonvolatile memory device stores 1032 hand wearable, barcode scanner, or both specific information comprising one or more data indicative of the life of the hand wearable, the life a scanner operatively coupled to the barcode scanner attachment device, or both. The nonvolatile memory device holds 1034 the stored hand wearable, barcode scanner, or both specific information when power to the nonvolatile memory device is turned off. The nonvolatile memory device is configured 1036 to make the stored hand wearable, barcode scanner, or both specific information available to a scanner connected to the barcode scanner attachment device, a cloud server, or both when the power to the nonvolatile memory device is turned on.

A predetermined predictive action protocol is implemented 930 to determine failure of the hand wearable. When the predetermined predictive action protocol indicates an impending failure of the hand wearable, an alert is generated or sent 932 to the barcode reader.

While the illustrative embodiments employ a hand wearable in the form of a band with a thumb support, as disclosed the hand wearable may be any wearable on the hand. That includes a wearable on the hand in any form factor including a wearable in the form factor of a glove, a wearable in the form factor of a band, a wearable in the form factor of a ring, and so on. For example, a ring scanner may go leaner on the wearable materials portion; but a barcode scanner attachment device configured for adapting a scanner to the ring, a trigger device, and the nonvolatile memory device; together providing wearable barcode scanner for tracking the failure rate and/or usage of a hand wearable and/or a trigger device in order to better implement predictive action to avoid an oncoming failure.

While this disclosure has been described in connection with specific embodiments, it is evident that numerous alternatives, modifications, and variations will be apparent to those skilled in the art within the spirit and scope of the above disclosure.

What is claimed is:

1. A hand wearable for bar code reading, comprising:
   a flexible body including a thumb opening, a back of the hand portion, a palm of the hand portion, and means for securing the flexible body about a hand;
   a barcode scanner attachment device on a back side of a back of the hand portion of the flexible body, the barcode scanner attachment device being configured to removably couple thereto a barcode reader;
   a trigger device on the back side of the back of the hand portion of the flexible body, the trigger device being electrically coupled to a trigger port of the barcode scanner attachment device;
   a nonvolatile memory device on the back side of the back of the hand portion of the flexible body, the nonvolatile memory device being electrically coupled to a memory port of the barcode scanner attachment device;
   wherein the nonvolatile memory device stores hand wearable, barcode scanner, or both specific information;
   wherein the nonvolatile memory device holds the stored hand wearable, barcode scanner, or both specific information when power to the nonvolatile memory device is turned off;
   wherein the nonvolatile memory device makes the stored hand wearable, barcode scanner, or both specific information available when the power to the nonvolatile memory device is turned on.

2. The hand wearable of claim 1, wherein the hand wearable, barcode scanner, or both specific information comprises one or more data indicative of the life of the hand wearable, the life of a scanner operatively coupled to the barcode scanner attachment device, or both.

3. The hand wearable of claim 1, wherein the nonvolatile memory device is selected from the group consisting of an EEPROM, a NAND flash, a NOR flash, an MRAM, and an FeRAM.

4. The hand wearable of claim 1:
   wherein the nonvolatile memory device comprises a volatile memory integrated circuit; and
   wherein the volatile memory integrated circuit includes a battery or capacitor adapted to provide power to the volatile memory integrated circuit to maintain data on the volatile memory when the volatile memory integrated circuit is switched off.

5. The wearable of claim 1 wherein the nonvolatile memory device resides on the barcode scanner attachment device; in proximity to the trigger device; or on the wearable between the trigger device and the barcode scanner attachment device.

6. The wearable of claim 1:
   wherein the electrical coupling of the trigger device to the trigger port is via a wire lead; and
   wherein the electric coupling of the nonvolatile memory device to the memory port of the barcode scanner attachment device is via a wire lead.

7. The hand wearable of claim 1, wherein the hand wearable, barcode scanner, or both specific information includes failure rate or usage.

8. The hand wearable of claim 7, wherein the usage information is selected from the group consisting of hand wearable identification number, hand wearable date of production, hand wearable date of delivery to the operator, barcode scanner identification number, barcode scanner date of production, barcode scanner operator identification, hand wearable use time, barcode scanner run time, number of trigger pressures, pressure applied during a trigger pressure, number or type of scanners used before failure, number of accelerations measured by an accelerometer or gyroscope placed anywhere in between the trigger and the hand wearable, and a combination thereof.

9. The hand wearable of claim 7, wherein tracking of failure rate or usage is used to implement a predetermined predictive action before failure.

10. The hand wearable of claim 1, wherein the trigger port and the memory port on the barcode scanner attachment device are the same and wherein a multiplexing protocol is applied to multiplex both signals from the trigger device and from the nonvolatile memory device onto a single port.

11. The hand wearable of claim 1, wherein the memory port of the barcode scanner attachment device receptacle is an SCOM port and wherein a serial protocol is applied to enable bi-directional communication between the nonvolatile memory device and the scanner.

12. The hand wearable of claim 1 in combination with a barcode scanner:

wherein the barcode scanner receives and stores the hand wearable, barcode scanner, or both specific information from the nonvolatile memory device of the hand wearable;

wherein the barcode scanner implements a predetermined predictive action protocol wherein the barcode scanner tracks and compares the hand wearable, barcode scanner, or both specific information against usage and failure rate specifications on the hand wearable, barcode scanner, or both specific information;

wherein the predetermined predictive action protocol generates an alert when the comparison indicates the hand wearable, barcode scanner, or both is approaching failure.

13. The hand wearable of claim 1 in combination with a barcode scanner, the barcode scanner including a processor and memory:

wherein the predetermined predictive action protocol comprises a set of instructions;

wherein the memory stores the set of instructions;

wherein the processor is configured to execute the set of instructions, the instructions causing the processor to execute the instructions, the instructions causing the processor to:

receive the hand wearable, barcode scanner, or both specific information from the nonvolatile memory device of the hand wearable;

store the received hand wearable, barcode scanner, or both specific information in the memory of the barcode scanner;

track the received hand wearable, barcode scanner, or both specific information to determine usage information on the hand wearable, barcode scanner, or both;

compare the usage information on the hand wearable against usage and failure rate specifications on the hand wearable, barcode scanner, or both;

generating an alert signal when the comparison indicates the hand wearable is approaching failure.

14. The hand wearable of claim 1 in combination with a barcode reader and an online cloud computer:

wherein the online cloud computer receives and stores the hand wearable, barcode scanner, or both specific information from the nonvolatile memory device of the hand wearable;

wherein the online cloud computer implements a predetermined predictive action protocol wherein the online cloud computer tracks and compares the hand wearable, barcode scanner, or both specific information against usage and failure rate specifications on the hand wearable, barcode scanner, or both;

wherein the predetermined predictive action protocol generates an alert when the comparison indicates the hand wearable is approaching failure.

15. The hand wearable of claim 1 in combination with a barcode reader and an online cloud computer:

wherein the online cloud computer receives and stores information on the usage of the barcode reader;

wherein the predetermined predictive action protocol tracks and compares the usage information against usage and failure rate specifications on a barcode reader;

wherein the predetermined predictive action protocol generates an alert when the comparison indicates the barcode scanner is approaching failure.

16. The hand wearable of claim 1 in combination with a barcode reader and an online cloud computer, the online cloud computer including a processor and memory:

wherein the predetermined predictive action protocol comprises a set of instructions;

wherein the memory stores the set of instructions;

wherein the processor is configured to execute the set of instructions, the instructions causing the processor to:

receive the hand wearable, barcode scanner, or both specific information from the nonvolatile memory device of the hand wearable;

store the received hand wearable, barcode scanner, or both specific information in the memory of the online cloud computer;

track the received hand wearable, barcode scanner, or both specific information to determine usage information on the hand wearable;

compare the usage information on the hand wearable against usage and failure rate specifications on the hand wearable;

generating an alert signal when the comparison indicates the hand wearable is approaching failure.

17. The hand wearable of claim 16:

wherein the instructions causing the processor further to:

receive usage information on a barcode reader used with the hand wearable;

store the received usage information in the memory of the online cloud computer;

track the received barcode reader usage information to determine usage information on the barcode reader;

compare the usage information on the barcode against usage and failure rate specifications on the barcode reader;

generating an alert signal when the comparison indicates the barcode reader is approaching failure.

18. A method of tracking the failure rate or usage of a hand wearable comprising the steps of:

providing a hand wearable comprising;
 a barcode scanner attachment device, the barcode scanner attachment device receptacle being configured to removably couple thereto a barcode reader;
 a trigger device, the trigger device being electrically coupled to a trigger port of the barcode scanner attachment device receptacle;
 a nonvolatile memory device, the nonvolatile memory device being electrically coupled to a memory port of the barcode scanner attachment device;
 wherein the nonvolatile memory device stores hand wearable, barcode scanner, or both specific information;
 wherein the nonvolatile memory device holds the stored hand wearable, barcode scanner, or both specific information when power to the nonvolatile memory device is turned off;
 wherein the nonvolatile memory device makes the stored hand wearable, barcode scanner, or both specific information available when the power to the nonvolatile memory device is turned on;

connecting a barcode reader to the barcode scanner attachment device;

connecting the barcode reader to an online cloud computer;

receiving at the barcode reader, the online cloud computer, or both hand wearable, barcode scanner, or both specific information from the nonvolatile memory device of the hand wearable;

storing the hand wearable, barcode scanner, or both specific information received from the nonvolatile memory device of the hand wearable;

tracking the failure rate or usage of the hand wearable used with the hand wearable;

implementing a predetermined predictive action protocol before failure of the hand wearable; and sending an alert to the barcode reader when the predetermined predictive action protocol indicates an impending failure of the hand wearable.

19. The method of tracking the failure rate or usage of a hand wearable and a scanner used with the hand wearable of claim 17:

wherein the nonvolatile memory device further stores hand wearable, barcode scanner, or both specific information comprising one or more data indicative of the life of a barcode scanner operatively coupled to the barcode scanner attachment device;

and wherein the method further comprising the steps of:

tracking the failure rate or usage of the barcode scanner used with the hand wearable;

implementing a predetermined predictive action protocol before failure of the barcode scanner; and sending an alert to the barcode reader when the predetermined predictive action protocol indicates an impending failure of the barcode scanner.

20. A method for manufacturing a wearable for tracking the failure rate or usage of the hand wearable, a scanner used with the glove, or both comprising the steps of:

providing a hand wearable;

securing a barcode scanner attachment device to the hand wearable, the barcode scanner attachment device being configured to removably couple thereto a barcode reader securing a trigger device to the hand wearable;

electrically coupling the trigger device to a trigger port of the barcode scanner attachment device receptacle;

securing a nonvolatile memory device to the hand wearable;

coupling the nonvolatile memory device to a memory port of the barcode scanner attachment device;

wherein the nonvolatile memory device stores hand wearable, barcode scanner, or both specific information comprising one or more data indicative of the life of the hand wearable, the life of a scanner operatively coupled to the barcode scanner attachment device, or both, the life a scanner operatively coupled to the barcode scanner attachment device, or both;

wherein the nonvolatile memory device holds the stored hand wearable, barcode scanner, or both specific information when power to the nonvolatile memory device is turned off; and wherein the nonvolatile memory device is configured to make the stored hand wearable, barcode scanner, or both specific information available to a scanner connected to the barcode scanner attachment device, a cloud server, or both.

\* \* \* \* \*